(12) United States Patent
Burch et al.

(10) Patent No.: US 7,450,124 B2
(45) Date of Patent: Nov. 11, 2008

(54) GENERATING 2D TRANSITIONS USING A 3D MODEL

(75) Inventors: Warren Lee Burch, Redmond, WA (US); Tzong-Jhy Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 11/083,378

(22) Filed: Mar. 18, 2005

(65) Prior Publication Data
US 2006/0209061 A1  Sep. 21, 2006

(51) Int. Cl.
*G06T 15/10* (2006.01)
(52) U.S. Cl. ..................................................... 345/427
(58) Field of Classification Search ........................ None
See application file for complete search history.

(56) References Cited

U.S. PATENT DOCUMENTS

| | | | |
|---|---|---|---|
| 5,148,154 A | | 9/1992 | MacKay et al. |
| 5,303,388 A | * | 4/1994 | Kreitman et al. ............ 715/836 |
| 5,369,735 A | * | 11/1994 | Thier et al. ................. 345/423 |
| 5,557,729 A | * | 9/1996 | Frean ......................... 715/803 |
| 5,678,015 A | * | 10/1997 | Goh ............................ 715/782 |
| 5,880,733 A | * | 3/1999 | Horvitz et al. ............... 715/850 |
| 5,926,603 A | | 7/1999 | Tanaka et al. |
| 5,999,173 A | | 12/1999 | Ubillos |
| 6,229,542 B1 | * | 5/2001 | Miller ......................... 715/782 |
| 6,351,765 B1 | | 2/2002 | Pietropaolo et al. |
| 6,389,168 B2 | * | 5/2002 | Altunbasak et al. ......... 382/224 |
| 6,404,978 B1 | | 6/2002 | Abe |
| 6,430,355 B1 | | 8/2002 | Nagasawa |
| 6,469,723 B1 | | 10/2002 | Gould et al. |
| 6,546,188 B1 | | 4/2003 | Ishii et al. |
| 6,597,358 B2 | * | 7/2003 | Miller ......................... 345/427 |

(Continued)

FOREIGN PATENT DOCUMENTS

EP  1383314 A2  1/2004

(Continued)

OTHER PUBLICATIONS

PowerPlugs: Transitions. CrystalGraphics. Feb. 2, 2004. http://web.archive.org/web/20040202001801/http://www.crystalgraphics.com/presentations/transitions.main.asp.*

(Continued)

*Primary Examiner*—Ulka Chauhan
*Assistant Examiner*—Peter-Anthony Pappas
(74) *Attorney, Agent, or Firm*—Senniger Powers LLP

(57) ABSTRACT

A system and method for generating a 2D transition between a first media object and a second media object. A 3D model is defined corresponding to a desired 2D transition pattern. A graphics processing unit (GPU) or a set of instructions generates a transition between the first media object and the second media object as a function of the defined 3D model. A transition generator maps a plurality of vertices of the first media object to a first mesh creating a first mapped media object where the first mesh relates to the 3D model. The transition generator maps a plurality of vertices of the second media object to a transition pattern mesh creating a second mapped media object where the transition pattern mesh relates to the 3D model. The GPU or the set of instructions renders the transition from the first mapped media object and the second mapped media object.

17 Claims, 12 Drawing Sheets

U.S. PATENT DOCUMENTS

| | | | |
|---|---|---|---|
| 6,628,303 | B1 | 9/2003 | Foreman et al. |
| 6,710,788 | B1* | 3/2004 | Freach et al. ............ 715/778 |
| 6,714,216 | B2 | 3/2004 | Abe |
| 6,731,287 | B1 | 5/2004 | Erdem |
| 6,928,613 | B1 | 8/2005 | Ishii et al. |
| 2001/0035875 | A1 | 11/2001 | Suzuki et al. |
| 2001/0041020 | A1 | 11/2001 | Shaffer et al. |
| 2002/0167541 | A1 | 11/2002 | Ando et al. |
| 2003/0002851 | A1 | 1/2003 | Hsiao et al. |
| 2003/0063125 | A1 | 4/2003 | Miyajima et al. |
| 2003/0086686 | A1 | 5/2003 | Matsui et al. |
| 2003/0142136 | A1* | 7/2003 | Carter et al. ............ 345/782 |
| 2003/0237091 | A1 | 12/2003 | Toyama et al. |
| 2006/0059426 | A1 | 3/2006 | Ogikubo |

FOREIGN PATENT DOCUMENTS

| | | | |
|---|---|---|---|
| GB | 2348759 | A | 10/2000 |
| JP | 05290548 | A | 11/1993 |

OTHER PUBLICATIONS

Kramer. Translucent Patches-Dissolving Windows. Proceedings of the 7th Annual ACM Symposium on User Interface Software and Technology. 1994. p. 121-130.*

Foley et al. Computer Graphics: Principles and Practice. Addison-Wesley Pub. Co., Inc. 1997. p. 471-476, 741-744, 835-840.*

Heroglyph V2 (software demo). Oct. 10, 2004. http://www.filecart.com/details/12782/441/Heroglyph.php.*

Dunlop, Robert, "Stencil Based Screen Wipes", Mar. 13, 2002, 2 pages, http://www.mvps.org/directx/articles/wipe/, USA.

Unknown, "Direct 3D Architecture", DirectX 9.0 SDK Update, Feb. 2005, 2 pages, http://msdn.microsoft.com/library/default.asp?url=/library/en-us/directx9_c/directx/graphics/programmingguide/gettingstarted/architecture.asp, USA.

Unknown, "Fixed Function FVF Codes", DirectX 9.0 SDK Update, Feb. 2005, 2 pages, http://msdn.microsoft.com/library/default.asp?url=/library/en-us/directx9_c/directx/graphics/programmingguide/gettingstarted/direct3dresources/vertexbuffers/vertexdeclaration/fixedfunctionfvfcodes.asp, USA.

Unknown, "3-D Primitives", DirectX 9.0 SDK Update, Feb. 2005, 2 pages, http://msdn.microsoft.com/library/default.asp?url=/library/en-us/directx9_c/directx/graphics/programmingguide/gettingstarted/3dcoordinatesystems/primitives.asp, USA.

Unknown, "ID3DXBaseMesh Interface", DirectX 9.0 SDK Update, Feb. 2005, 2 pages, http://msdn.microsoft.com/library/default.asp?url=/library/en-us/directx9_c/directx/graphics/reference/d3dx/interfaces/id3dxbasemesh/_id3dxbasemesh.asp, USA.

Unknown, "Mesh Support in D3DX", DirectX 9.0 SDK Update, Feb. 2005, 3 pages, http://msdn.microsoft.com/library/default.asp?url=/library/en-us/directx9_c/directx/graphics/programminguide/gettingstarted/d3dx/d3dxmeshes.asp, USA.

Unknown, "X Files (Legacy)", DirectX 9.0 SDK Update, Feb. 2005, 1 page, http://msdn.microsoft.com/library/default.asp?url=/library/en-us/directx9_c/directx/graphics/programmingguide/gettingstarted/xfiles/xfiles.asp, USA.

Unknown, "Transforms", DirectX 9.0 SDK Update, Feb. 2005, 4 pages, http://msdn.microsoft.com/library/default.asp?url=/library/en-us/directx9_c/directx/graphics/programmingguide/fixedfunction/transforms/transforms.asp, USA.

Unknown, "Triangle Interpolation", DirectX 9.0 SDK Update, Feb. 2005, 1 page, http://msdn.microsoft.com/library/default.asp?url=/library/en-us/directx9_c/directx/graphics/programmingguide/gettingstarted/3dcoordinatesystems/triangleinterpolants.asp, USA.

Unknown, "Texture Blending", DirectX 9.0 SDK Update, Feb. 2005, 2 pages, http://msdn.microsoft.com/libraby/default.asp?url=/library/en-us/directx9_c/directx/graphics/programmingguide/gettingstared/direct3dtextures/blending/textureblending.asp, USA.

Unknown, "Texture Coordinates", DirectX 9.0 SDK Update, Feb. 2005, 3 pages, http://msdn.microsoft.com/library/default.asp?url=/library/en-us/directx9_c/directx/graphics/programmingguide/gettingstarted/direct3dtextures/coordinates/texturecoordinates.asp, USA.

Unknown, "Alpha Blending", DirectX 9.0 SDK Update, Feb. 2005, 1 page, http://msdn.microsoft.com/library/default.asp?url=/library/en-us/directx9_c/directx/graphics/programmingguide/gettingstarted/rendering/alphablending/alphablending.asp, USA.

Unknown, "Alpha Testing State", DirectX 9.0 SDK Update, Feb. 2005, 1 page, http://msdn.microsoft.com/library/default.asp?url=/library/en-us/directx9_c/directx/graphics/programmingguide/gettingstarted/direct3ddevices/states/renderstates/alphatestingstate.asp, USA.

Unknown, "Depth Buffers", DirectX 9.0 SDK Update, Feb. 2005, 2 pages, http://msdn.microsoft.com/library/default.asp?url=/library/en-us/directx9_c/directx/graphics/programmingguide/gettingstarted/rendering/depthbuffers/depthbuffers.asp, USA.

Unknown, "Stencil Buffer Techniques", DirectX 9.0 SDK Update, Feb. 2005, 2 pages, http://msdn.microsoft.com/library/default.asp?url=/library/en-us/directx9_c/directx/graphics/programmingguide/advancedtopics/pixelpipe/stencilbuffer/stencilbuffertechniques.asp, USA.

Unknown, "State Blocks Save and Restore State", DirectX 9.0 SDK Update, Feb. 2005, 1 page,http://msdn.microsoft.com/library/default.asp?url=/library/en-us/directx9_c/directx/graphics/programmingguide/gettingstarted/direct3ddevices/states/usingstateblocks.asp, USA.

Unknown, "Effects", DirectX 9.0 SDK Update, Feb. 2005, 2 pages, http://msdn.microsoft.com/library/default.asp?url=/library/en-us/directx9_c/directsx/graphics/programmingguide/effects/effects.asp, USA.

Unknown, "Managing Resources", DirectX 9.0 SDK Update, Feb. 2005, 1 page, http://msdn.microsoft.com/library/default.asp?url=/library/en-us/directx9_c/directx/graphics/programmingguide/gettingstarted/direct3dresources/managingresources.asp, USA.

Unknown, "Using the Main Loop with the Sample Framwork", DirectX 9.0 SDK Update, Feb. 2005, 3 pages, http://msdn.microsoft.com/library/default.asp?url=/library/en-us/directx9_c/directx/graphics/programmingguide/sampleframework/sfusingthemainloop.asp, USA.

* cited by examiner

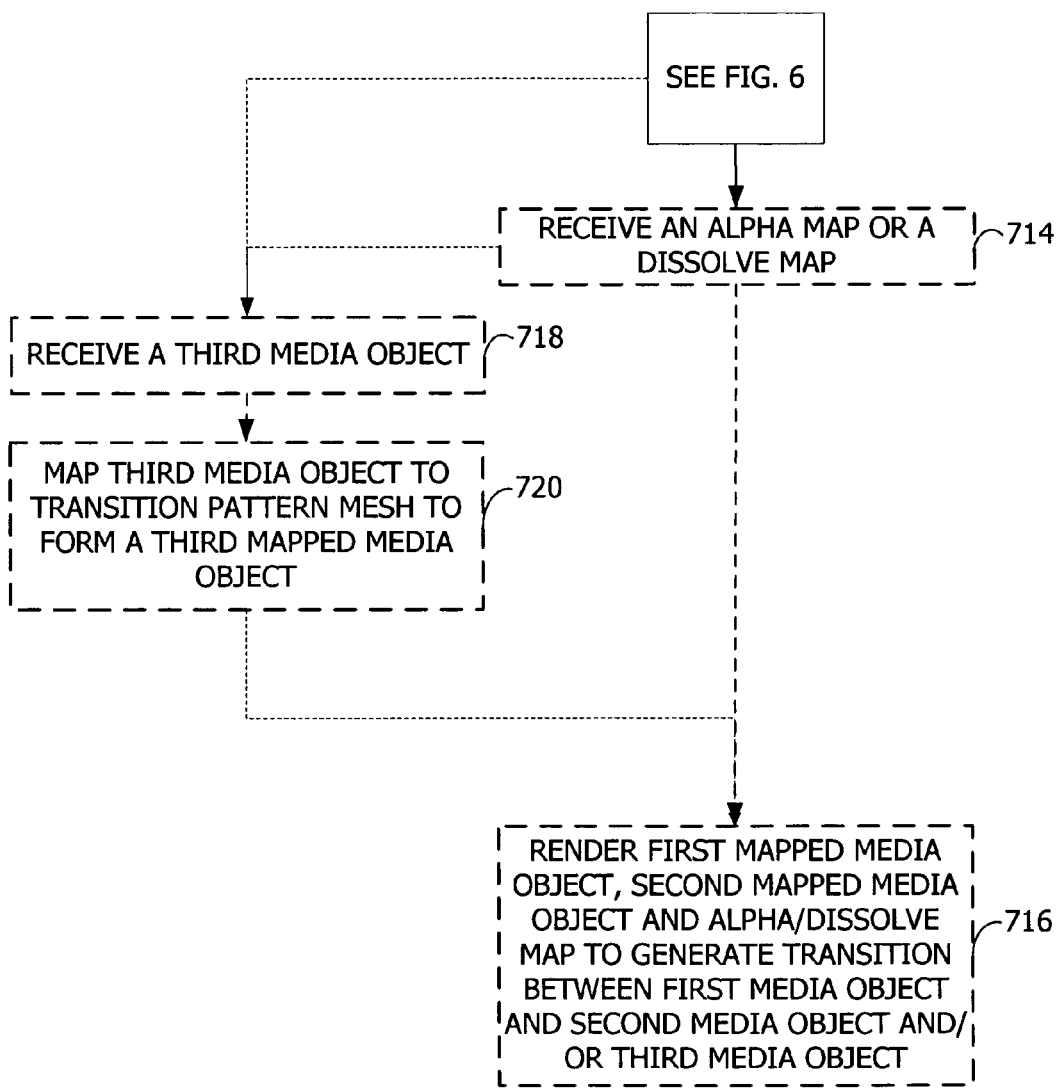

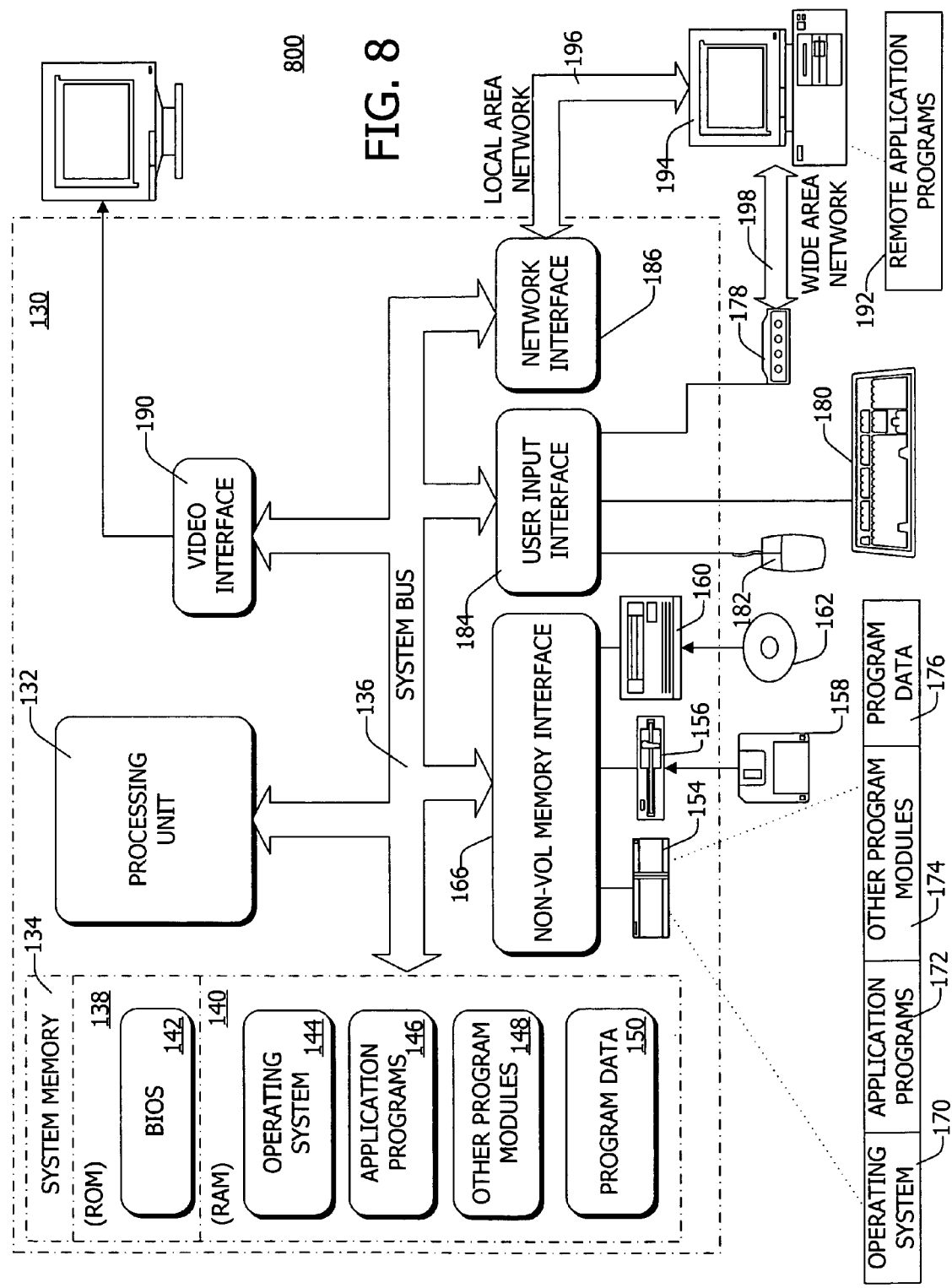

GENERATING 2D TRANSITIONS USING A 3D MODEL

TECHNICAL FIELD

Embodiments of the present invention generally relate to the field of graphics animation and processing. In particular, embodiments of this invention relate to generating two dimensional transitions using a three dimensional model and the processing capabilities of a graphics processing unit.

BACKGROUND OF THE INVENTION

In a typical graphics processing, software applications use a hardware interface (e.g., a graphical device interface (GDI)) to display or print bitmapped text (e.g., TrueType fonts), images, and other graphical elements. For example, the GDI is responsible for drawing items (such as dialog boxes, buttons, and other graphical elements) in a consistent style on a screen by calling the appropriate display drivers and passing them the information on the items to be drawn. In order to take advantage of the GDI, a software program typically uses a set of routines, such as those provided in a software development kit (SDK) library to configure these software applications to call GDI functions. For example, a SDK library includes functions such as icon operations, rectangle operations, or the like.

Under the current computer systems and configurations, most GDI features are executed by a central processing unit (CPU). As a result, apart from executing other processes, the CPU needs to process graphics elements and images, such as rendering 2D images, video streams, or the like. The additional graphical processing impedes overall performances of the CPU and a computer system because graphical processing requires extensive calculations of graphical parameters, such as pixel or texture calculation, rendering or animation of images, or the like. While CPU processing of these graphics or images is adequate, an improvement in graphics or image processing is desirable.

In addition, most current systems or applications use two dimensional algorithms to process graphics effects. For example, a user may insert a transition between two media objects or images such that the resulting sequence of displaying the two media object has a smooth transition. In existing systems, the CPU needs resources and time to execute the algorithms and programming instructions in addition to displaying the resulting sequence.

Accordingly, a system and method for delegating or shifting graphics processing tasks to a graphics processing unit (GPU) is desirable by using a 3D model and fixed pipeline functions of the GPU to create two dimensional graphical effects. Alternatively, a system and method for creating two dimensional graphics effects using a set of instructions for processing the two dimensional effects in the 3D coordinate system is desired.

SUMMARY OF THE INVENTION

Embodiments of the present invention overcome one or more disadvantages of the prior art by implementing two dimensional transitions using a three dimensional coordinate system. Instead of sending the transformed data relating to two dimensional transitions to the CPU to perform matrix calculations, pixel or texture calculations, embodiments of the present invention send data to the GPU, without sending them to the CPU, so that the GPU may process the data more efficiently. The GPU may render media objects, animations or other graphical elements onto a video buffer to be ready for display. Alternatively, a set of computer-executable instructions or software applications may process the data in the 3D coordinate system to create two dimensional effects. Hence, embodiments of the present invention reduce bus traffic, CPU load, and assist in shorten rendering time of processing of transitions, animations, or other graphical transformations.

In addition, embodiments of the present invention make some transitions between media objects or images (e.g., dissolve, cross-fade or simple wipe transitions) take up less CPU time and make developing new visual variants and transition patterns more efficiently. This design provides users a rich collection of visual variants by mixing wipe patterns, rendering techniques, and parameters. Embodiments of the present invention also use the GPU fixed function pipeline to execute and process three dimensional media objects while producing two dimensional graphical effects on a large proportion of machines currently in the market. Alternatively, embodiments of the invention may use fixed function pipeline of a set of instructions or software applications to process three dimensional media objects to produce two dimensional graphical effects.

In accordance with one aspect of the invention, a method generates a two dimensional transition between a first media object and a second media object using a graphics processing unit. A three dimensional model corresponding to a desired two dimensional transition pattern is defined. A transition between the first media object and the second media object is generated as a function of the defined three dimensional model using the graphics processing unit.

According to another aspect of the invention, a system generates a two dimensional transition between a first media object and a second media object. An interface receives the first media object, the second media object, and a transition pattern mesh. A transition generator maps a plurality of vertices of the received first media object to a first mesh to create a first mapped media object. The transition generator maps a plurality of vertices of the received second media object to the transition pattern mesh to create a second mapped media object. A graphics processor renders the transition between the first media object and the second media object from the first mapped media object and the second mapped media object.

According to yet another aspect of the invention, a system generates a transition between a first media object and a second media object. A first processor or first set of instructions renders the first media object and the second media object. An interface receives the first media object, the second media object, and a transition pattern mesh. A transition generator maps a plurality of vertices of the received first media object to a first mesh to create a first mapped media object. The transition generator maps a plurality of vertices of the received second media object to the received transition pattern mesh to create a second mapped media object. A second processor or second set of instructions, independent of the first processor or the first set of instructions, for rendering the transition between the first media object and the second media object from the first mapped media object and the second mapped media object.

Alternatively, the invention may comprise various other methods and apparatuses.

Other features will be in part apparent and in part pointed out hereinafter.

BRIEF DESCRIPTION OF THE DRAWINGS

FIG. 7 is a flow chart illustrating a method for creating additional effects to the transition between the first media object and the second media object according to one embodiment of the invention.

FIG. 8 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
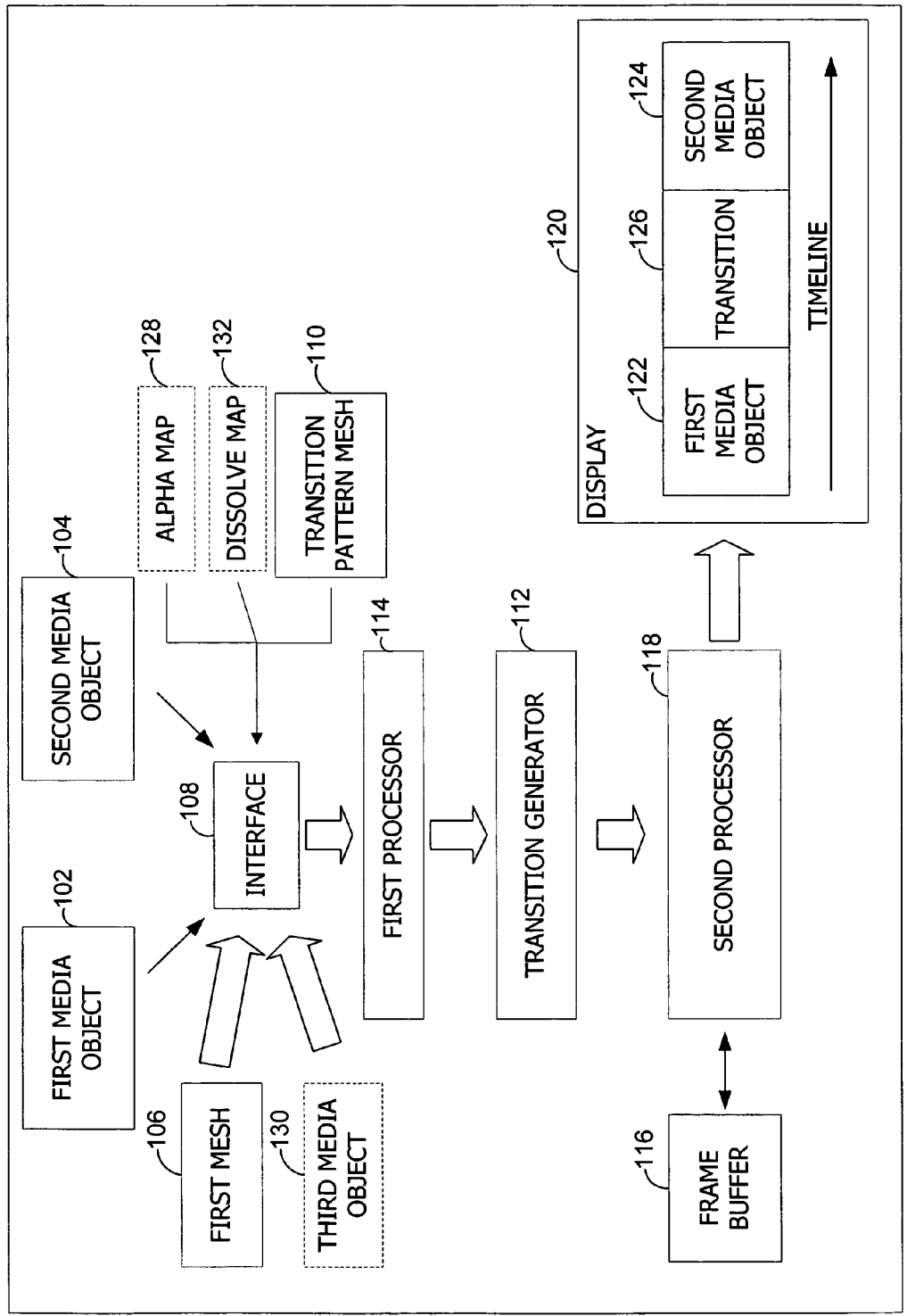
FIG. 1 is a block diagram illustrating a system for generating a two dimensional transition between a first media object and a second media object according to one embodiment of the invention.

Referring first to FIG. 1, a block diagram illustrates a system 100 for generating two dimensional (2D) transitions between a first media object 102 and a second media object 104 according to one embodiment of the invention. A transition is a progressive change on a display from a first media object to a second media object according to a pattern. For example, supposed the first media object 102 is a white color image and the second media object 104 is a black color image, and a user wishes to transition from the white color image to the black color image. One implementation of transitions may be a left-to-right wipe transition in which the black color image progressively replaces the white color image from the left to the right until the black color image is fully visible and completely replaces the white color image. Such left-to-right wipe transition may include patterns such as a vertical line moving from left to right horizontally across the white color image and introducing the black color image to the left of the vertical line as the vertical line progressively moves from left to right until the black color image completely replaces the white color image. Other patterns, such as a horizontal line moving vertically, two vertical lines moving from the center, or the like patterns may be implemented.

The system 100 may be a system 130 as illustrated in FIG. 8 or other computerized system that includes a first processor 114, a second processor 118, a display 120, and a storage (not shown). In another embodiment, system 100 includes an application program interface (API) for manipulating and displaying three dimensional (3D) objects. For example, such API may be Direct3D® by Microsoft Corporation, Quick-Draw® 3D by Apple Computer, Inc., or OpenGL® by Silicon Graphics Incorporated. The first processor 114 may be a CPU, other centralized or main processor, a first set of computer-executable instructions, or software application for processing. The second processor 118 may be a GPU, other secondary processor, a second set of computer-executable instructions, or software application for processing data relating a 3D model.

Initially, a first media object 102 and a second media object 104 are displayed on the display 120. For example, the first media object 102 or the second media object 104 may be a file or a collection of files for a still image, a video stream, or other graphical elements (e.g., icons, buttons, web pages, or the like) to be displayed on display 120. A user may wish to create a smooth or other interesting transition between first media object 102 and second media object 104 in a timeline. In addition to creating interesting transitions, the user may want viewers to focus on the story portrayed through the media objects and not the transitions and/or effects. As such, the user may want create the transition with subtle effects and variations. For example, supposed the user wishes to bring excitement or share glory to viewers, such as presenting a trophy, the user may want the trophy to make a grand entrance to the scene by creating a transition between first media object 102 and second media object 104 so that the trophy presentation is pronounced. On the other hand, the user may generate a subtle transition (such as soft edge, dissolve edge, and/or fancy edge transition) to transition viewers to the end of a movie scene.

The first media object 102 and second media object 104 are received by an interface 108. For example, the interface 108 may be a graphical user interface (GUI) of a software application or other interface means to receive first media object 102 and second media object 104. The first media object 102 and second media object 104 may be input to interface 108 from a non-volatile storage, a volatile storage, or the like, via a direct transmission such as a communication network (e.g., a system bus, internet, intranet, or the like).

Figure 2A:
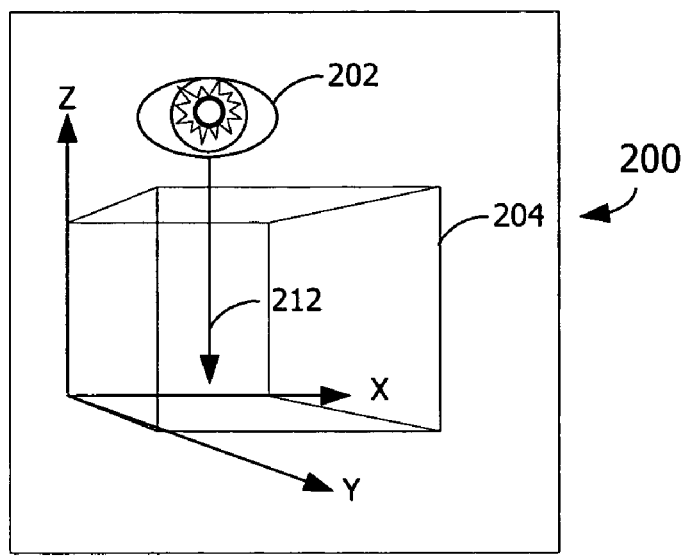
FIG. 2A is a diagram illustrating a three dimensional model according to one embodiment of the invention.

In one example, the user may create a wipe transition between first media object 102 and second media object 104. While a wipe transition is a 2D graphical effect (e.g., second media object 104 moving across the computer display from left to right to replace first media object 102), embodiments of the present invention defines a 3D model (e.g., x-,y-, z-coordinate system) for any given transition. For example, FIG. 2A is a block diagram illustrating a 3D model 200 according to one embodiment of the invention. The model 200 shows a 3D view space 204 with three axes: x-axis, y-axis and z-axis. In another embodiment, the 3D view space 204 is configured to adapt to different screen aspect ratio (e.g., 4×3 or 16×9) of display 120. The model 200 also illustrates an eye 202 to show that the viewer is looking at the direction opposite to the z-axis (as shown by arrow 212). In other words, the z-axis points to the viewer.

Figure 2B:
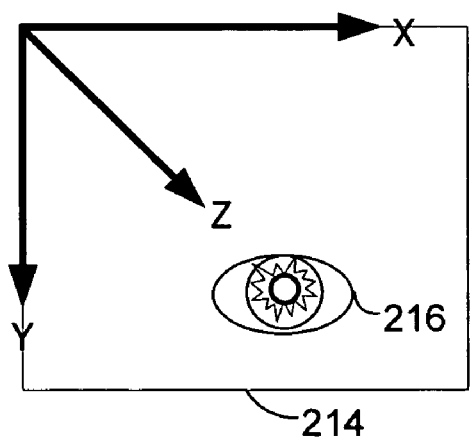
FIG. 2B is a diagram illustrate an orthogonal projection transform according to one embodiment of the invention.

Referring now to FIG. 2B, a diagram illustrates an orthogonal projection transform 214 for mapping a 2D media object to a 3D model according to one embodiment of the invention. The transform 214 is a 2D square having an x-axis along the horizontal edge and a y-axis being perpendicular to the x-axis. In one embodiment, the length and width of transform 214 is set to 1 unit such that the visible range is 0 to 1. That is, the transform 214 is a 1×1 unit square. It is to be understood that other shapes or polygons (e.g., triangle, rectangles, or the like) may be used for mapping a 2D shape to a 3D model. A z-axis points to an eye 216 which locates above the x-y plane. As an example shown in FIG. 2B, the eye is located at the position (0.5, 0.5, 1.0) (e.g., viewing from the top of the x-y plane). In other words, a 2D media object may be mapped to the transform 214 (i.e., a 0,0->1.0,1.0 space) so that the 2D media object may be represented by data relating to the 3D coordinate system in the 3D model. Such data may be processed by the GPU, a set of computer-executable instructions, or software applications to create the 2D graphical effects.

Figure 2C:
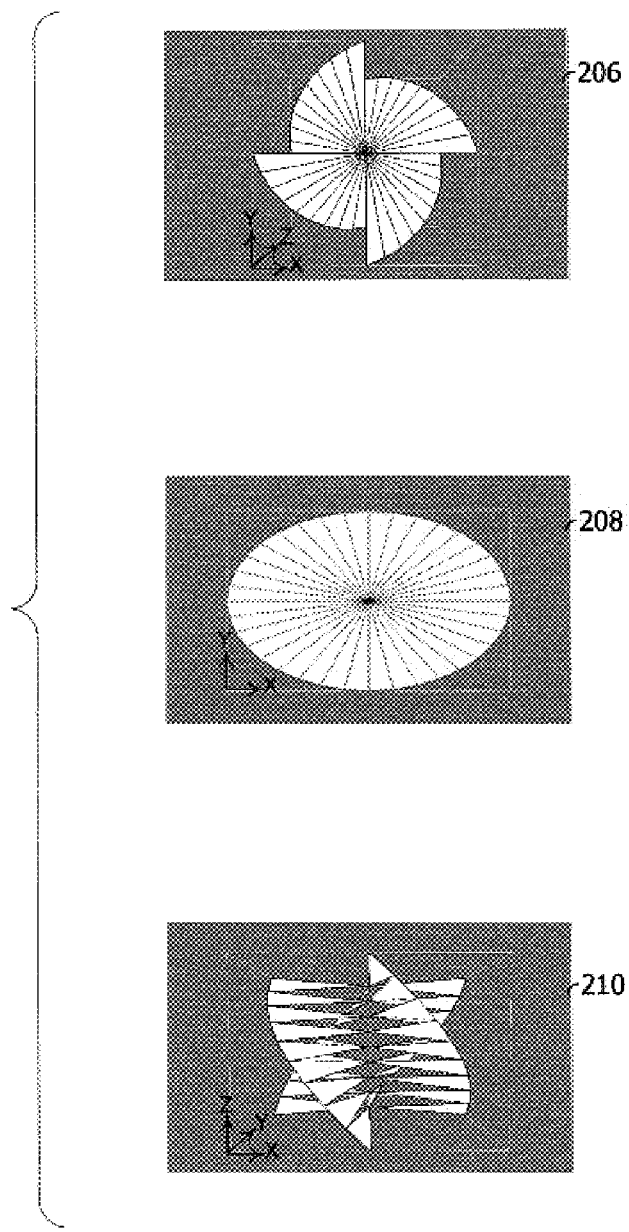
FIG. 2C is an illustration of views of a transition pattern in different dimensions according to one embodiment of the invention.

FIG. 2C is an illustration of views of a transition pattern in different dimensions according to one embodiment of the invention. As an example, views 206, 208 and 210 depict a wheel transition in different view spaces. A perspective side view 206 is a wheel transition in a 3D model, as indicated by the x-y-z coordinate symbols. In many existing systems that use 3D transformations, perspective view 206 simulates human vision by making objects closer to human eyes larger than objects farther from human eyes. On the other hand, an orthogonal view 208 flattens the wheel transition in 2D, as indicated by x-y coordinate symbols, to an ellipse in an aerial view. This is an exemplary view of the wheel transition as it is displayed when transitioning from first media object 102 to second media object 104 as a 2D transition. A transition pattern mesh view 210 from the z-axis, on the other hand, is view of the wheel transition after the transition pattern mesh 110 is applied.

Figures 3A, 3B, 3C:
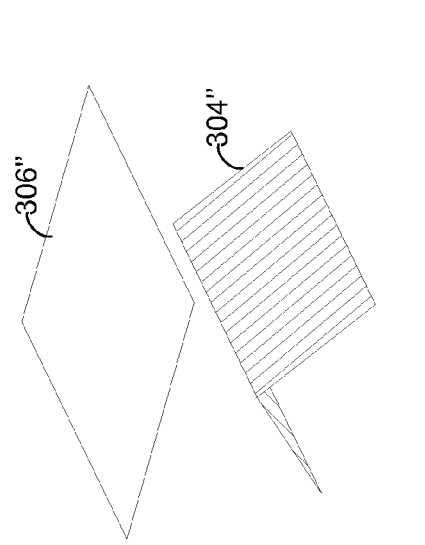
FIGS. 3A-F are diagrams illustrating an implementation of a transition pattern mesh according to one embodiment of the invention.

To further describe transition pattern mesh view 210, FIGS. 3A-F are diagrams illustrating an implementation of a transition pattern mesh 110, such as a wipe transition that replaces a first media object 304 with a second media object 306 from the center of the first media object 304, according to one embodiment of the invention. For example, as shown in FIG. 3A, first media object 304 is an image filled with lines and second media object 306 is a white colored image. The user, viewing from the direction represented by an eye 302, wishes to introduce second media object 306 to first media object 304 from the center. Initially, the user only sees first media object 304 as shown by 308 in FIG. 3D. In FIG. 3B, the wipe transition pattern mesh is mapped onto first media object 304 to form a first mapped media object 304'. For example, each vertex or pixel point of first media object 304 is transformed or registered onto the transition pattern mesh, which is in 3D, so that each pixel point on the transition pattern mesh in 3D matches the corresponding vertex or pixel point on first media object 304 in 2D. In one embodiment, the second media object 306 is mapped to a first mesh 106 to form a second mapped media object 306', where the first mesh 106 will be discussed below.

Figures 3D, 3E, 3F:
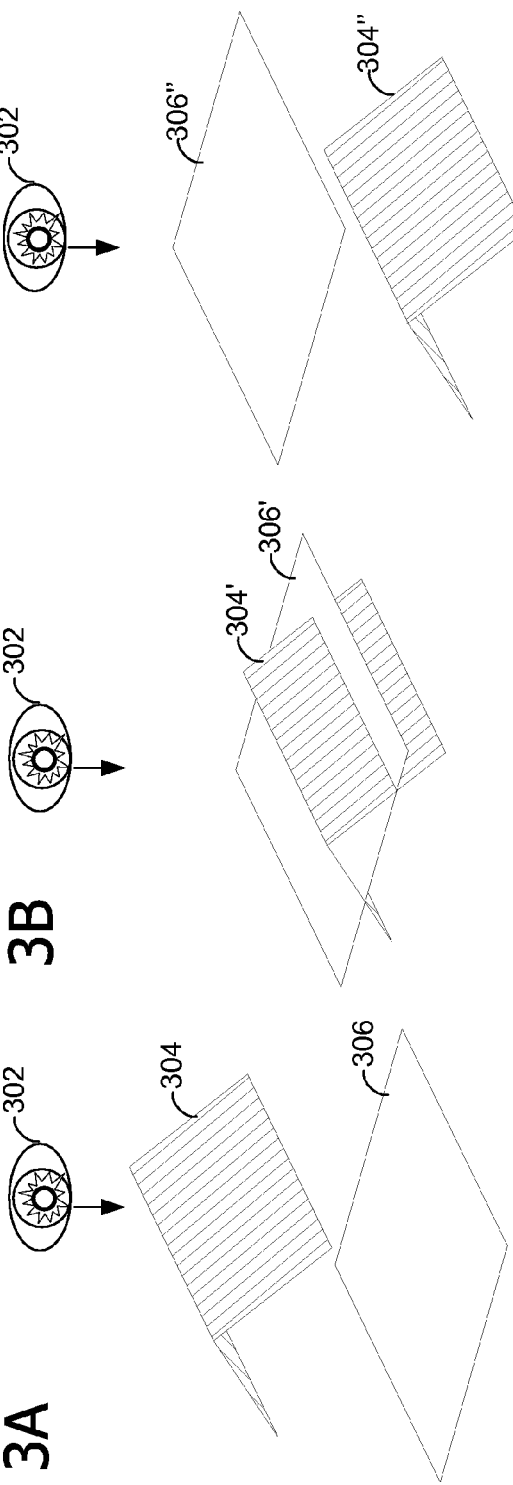

Still Referring to FIG. 3B, as the wipe transition progresses, a first mapped media object 304' moves toward a second media object 306', such that the user sees what's shown by 308' in FIG. 3E. In other words, the user begins to see the transitioning of first media object 304 to second media object 306. In FIG. 3C, when the transition progress has completed, the user will only see a resulting second media object 306" while first mapped media object 304" is invisible to the user, as shown by 308" in FIG. 3F.

In one embodiment, during the transition progress, second media object 306' moves toward first mapped media object 304'. In another embodiment, first mapped media object 304' and second media object 306' moves toward each other during the transition progress. As such, by using the transition pattern mesh in 3D, 2D transitions, although known to those skilled in the art, are processed by the GPU or software applications, instead of the CPU, so that these transitions are processed more efficiently.

Returning to FIG. 1, interface 108 also receives a first mesh 106 and a transition pattern mesh 110 to which the media objects are mapped so that a transition between the media objects can be rendered. For example, the first mesh 106 may be a full screen rectangle mesh for mapping vertices of first media object 102 to form a first mapped media object. In other words, each vertex of first media object 102 is mapped onto first mesh 106 in 3D coordinates such that the GPU or software applications may process or calculate pixel values corresponding to each vertex for display. Using FIG. 2B as another example, transform 214 has a width of 1 unit and a length of 1 unit, creating a 1×1 square. Each of the four corners of transform 214, in 2D coordinate system, may be represented as (0,0), (1,0), (1,1) and (0,1) as shown in FIG. 2B. In mapping first media object 102 to first mesh 106, each pixel point or vertex of first media object 102 is registered or transformed to transform 214. Also, the z-coordinate of transform may be set to 0 to represent a flat 3D object.

In one embodiment, first mesh 106 includes vertex data of first media object 102 relating to texture coordinates (e.g., texture values relating to individual color values in a texture space in 3D). In another embodiment, the texture coordinate values for each vertex equal to the values of values of x, y coordinate, i.e. (tu, tv)=(x, y) such that four corners of the texture are mapped to four corners of first mesh 106. In another embodiment, the Gouraud shading mode is used and the texture values are applied to fill first mesh 106. Section 2 of Appendix A describes exemplary implementation of creating first mesh 106. For information on first mesh and/or transition pattern mesh implementation, the entire "DirectX® Software Development Kit" of MICROSOFT® Direct3D®, available on the MICROSOFT® Developer Network (MSDN®) subdomain of MICROSOFT® web site, is hereby incorporated by reference.

In another embodiment, the first mesh 106 defines a set of vertices and a set of polygon faces. After receiving first mesh 106 and first media object 102, a transition generator 112 maps first media object 102 onto first mesh 106 to form the first mapped media object. Also, the transition pattern mesh 110 includes transition patterns to be selected by users for transitioning from first media object 102 to second media object 104 or vice versa. For example, interface 108 displays examples of a variety of transitions, such as a wipe transition with various shapes, or the like on display 120 and the user may use an input device (e.g., a mouse or a keyboard) to select a desired transition pattern.

Figure 4A:
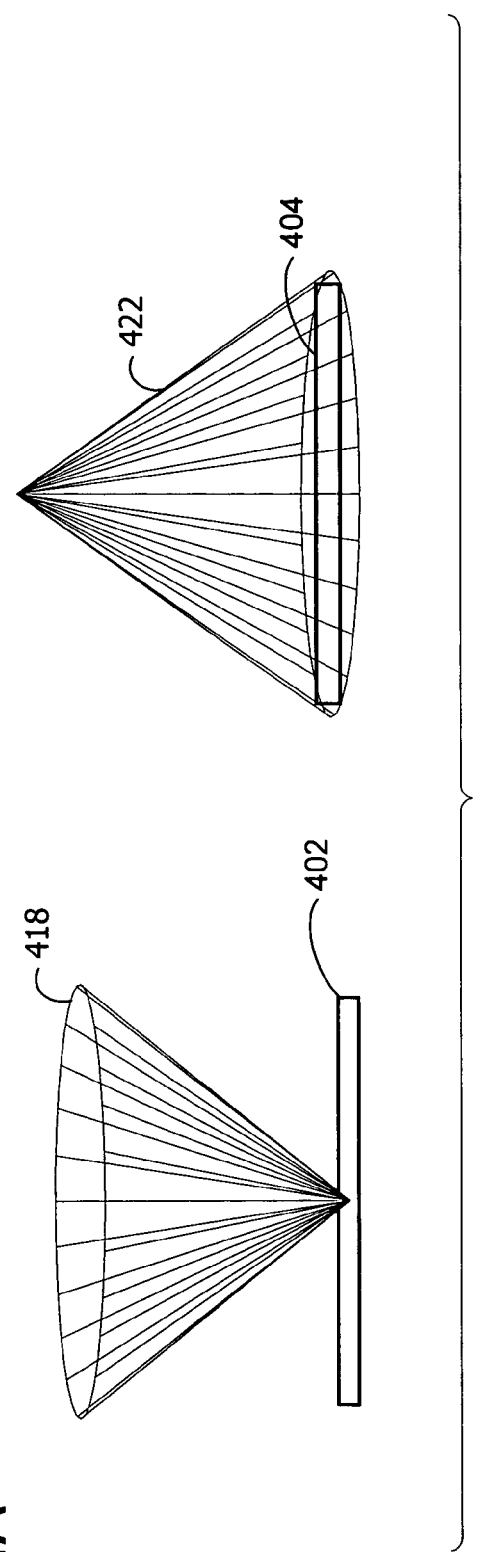
FIGS. 4A-C are illustrations of an implementation of a circle wipe transition pattern using the three dimensional model according to one embodiment of the invention.
Figure 4B:
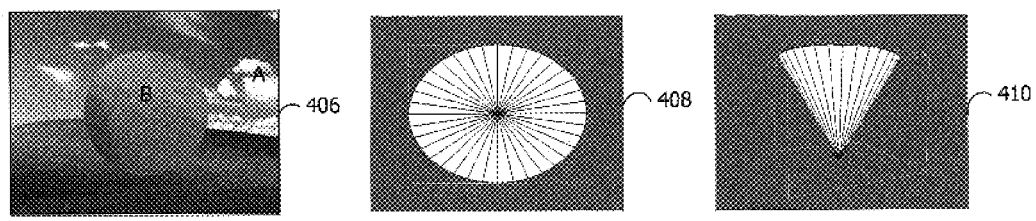
Figure 4C:
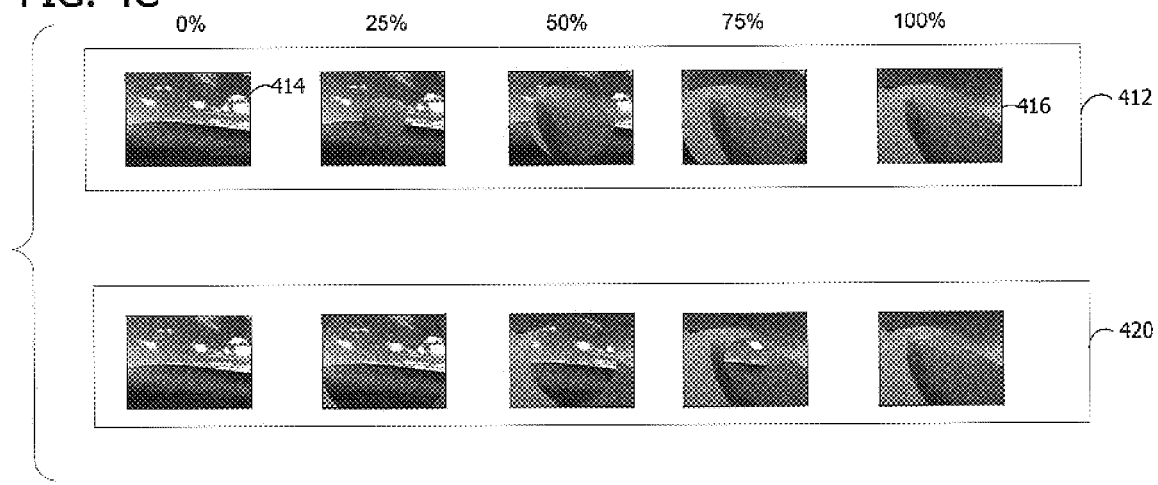

FIGS. 4A-C are illustrations of an implementation of circle out and circle in wipe transitions patterns using the 3D model according to one embodiment of the invention. First, FIG. 4A shows a perspective side view of a circle-out wipe transition as a transition pattern. An incoming or first media object 402 (after being mapped by a circle transition pattern) is shown to transition to an outgoing or second media object 418. For example, the beginning, (or when z-coordinate value is near 0), the incoming or first media object 402 would appear as a small circle on the outgoing or second media object 418. In this circle out wipe transition, the user sees a circle emerge from the center of the screen or display 120. As transition progresses, the circle becomes larger. The incoming or first media object 402 appears within the circle and outgoing or second media object 418 is displaced by incoming or first media object 402 as the circle becomes larger. As such, the z-coordinate for the incoming or first media object 402 represents transition progress. As z-coordinate value increases, the point or the small circle increases its radius from small to larger such that outgoing or second media object 418 is transitioned to incoming or first media object 402. In one embodiment, the viewing space is limited the viewer's display (e.g., display 120), as such, parts of the circle transition may be cropped as they may not be displayed by display 120.

Similarly, another perspective side view a circle-in wipe transition of an incoming or second media object 404 and an outgoing or first media object 422. Instead of starting from a point at the beginning (or when z-coordinate value is near 0), the circle-in wipe transition starts with a larger circle to a point as incoming or second media object 404 transitions to outgoing or first media object 422.

To further illustrate, FIG. 4B shows three views of a circle wipe transition. A screen shot 406 shows a snapshot of a first media object A transitioning to a second media object B with a circle-out wipe. An orthogonal view 408 shows the circle in a 2D view while a perspective side view 410 shows that the circle in a cone shape. As such, embodiments of the present invention apply a circle shaped transition to the 3D model, such as model 200, so that a 2D circle is transformed as a cone shape. By using transition pattern mesh 110 in a 3D model, embodiments of the present invention send data relating to the 3D model for 2D transitions to second processor or a second set of instructions 118 (collectively as "second processor 118") so that the 2D transitions may be processed more efficiently.

FIG. 4C illustrates another example of progressions of a circle-out and circle-in transition according to one embodiment of the invention. For example, a block 412 depicts a first media object 414 as an outgoing media object transitioning to a second media object 416 as an incoming media object via a circle-out wipe transition. At transition progress 0%, the block 412 shows the first media object 414 only. At progress 25%, the second media object 416 starts to appear as the circle-out transition introduces second media object 416. As progress increases to 100%, block 412 shows how a 2D circle-out wipe transition is displayed. Similarly, a block 420 depicts first media object 414 as an outgoing media object transitioning to second media object 416 via a circle-in wipe transition.

It is to be understood that while the user experience of wipe transitions with different patterns may be known in the art, processing 2D transitions using 3D transition patterns using a GPU or software applications is more efficient and uses less CPU processing.

Figure 5A:
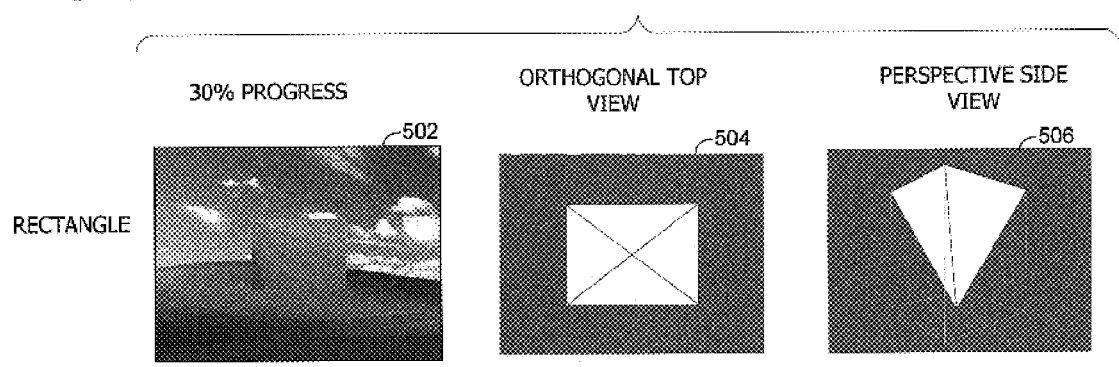
FIGS. 5A-B are illustrations of implementations of exemplary transition patterns according to one embodiment of the invention.
Figure 5B:
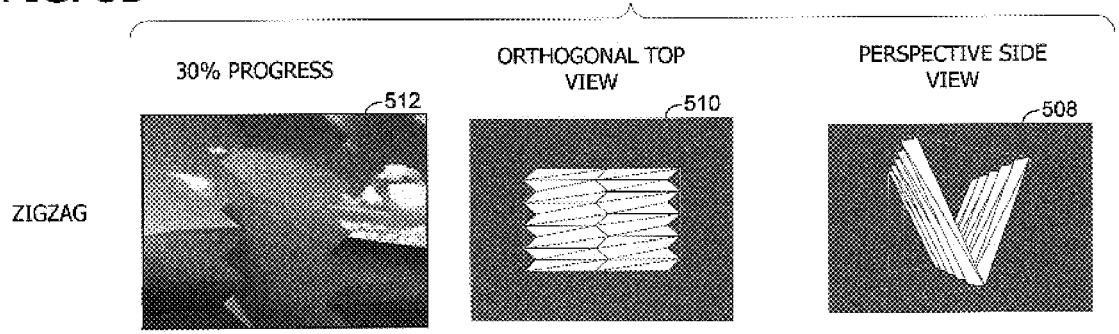

It is also to be understood that transition patterns as shown in FIGS. 4A to 4C (e.g., the circle-in and circle-out wipe transitions) are illustrated by way of example and not limitations. For example, other transition patterns, such as swipe, diagonal down, star, wheel, bow tie, circle, rectangle, split, reveal and inset, iris, filled V, zigzag, checkerboard, diagonal box, diagonal cross, diamond, radar, stars, circles, keyhole, heart, sweep (-in, -up, -out, -down), fan (-up, -out, -down, -in), eye, or other transitions may be implemented without departing from the spirit of the present invention. As additional examples, see FIGS. 5A and 5B which are illustrations of implementations of exemplary transition patterns according to one embodiment of the invention. FIG. 5A shows a rectangle transition at 30% progress. FIG. 5A also depicts an orthogonal top view and a perspective side view. Similarly, FIG. 5B depicts a zigzag transition at 30% progress, an orthogonal top view and a perspective side view of the transition pattern. In addition, section 1 of the Appendix A describes an implementation of creating transition patterns using a 3D model.

Similar to forming the first mapped media object, transition generator 112, after receiving second media object 104 and transition pattern mesh 110 from interface 108, maps transition pattern mesh 110 to vertices of second media object 104 to create a second mapped media object. The first mapped media object and the second mapped media object are transmitted to second processor 118 for rendering a transition 126 between first media object 102 and second media object 104 from a first mapped media object 122 and a second mapped media object 124 on display 120. For example, block 412 in FIG. 4C shows the result of rendering of a circle-out transition from first mapped media object 414 and second mapped media object 416 using second processor or second set of instructions 118.

In one embodiment, system 100 also includes a frame buffer 116 to temporarily store vertex, texture, stencil or other data for second processor 118 for rendering the transition 126. For example, second processor 118 may process a wipe transition in the following rendering sequence: (1) render the transition pattern mesh to a mask if needed; (2) render first mesh 106 to frame buffer 116; and (3) render transition pattern mesh 110 to frame buffer 116. For example, at each step, second processor 118 maintains a rendering state in the sequence so that, before displaying the next media object or transition, system 100 may apply the proper rendering state to the displaying media object or transition. In another example, frame buffer 116 may be a video memory in a volatile storage, non-volatile storage, or other storage medium.

In another embodiment, second processor 118 creates temporary objects to assist in rendering the transition 126. For example, during rendering of a transition (e.g., a wipe transition), second processor 118 may create temporary objects to access additional hardware and software functions, such as accelerated rasterization and hardware/software vertex processing. In yet another embodiment, second processor 118 creates additional temporary objects to handle first and transition pattern meshes, alpha and dissolve blending (to be discussed below). For example, second processor 118 creates temporary objects to create or load first mesh 106, transition pattern mesh 110, alpha and dissolve blending so that these objects may call or execute specific functions from hardware or software. These temporary objects may be removed or destroyed from the storage after second processor 118 renders transition 126 or other processing.

Figure 6:
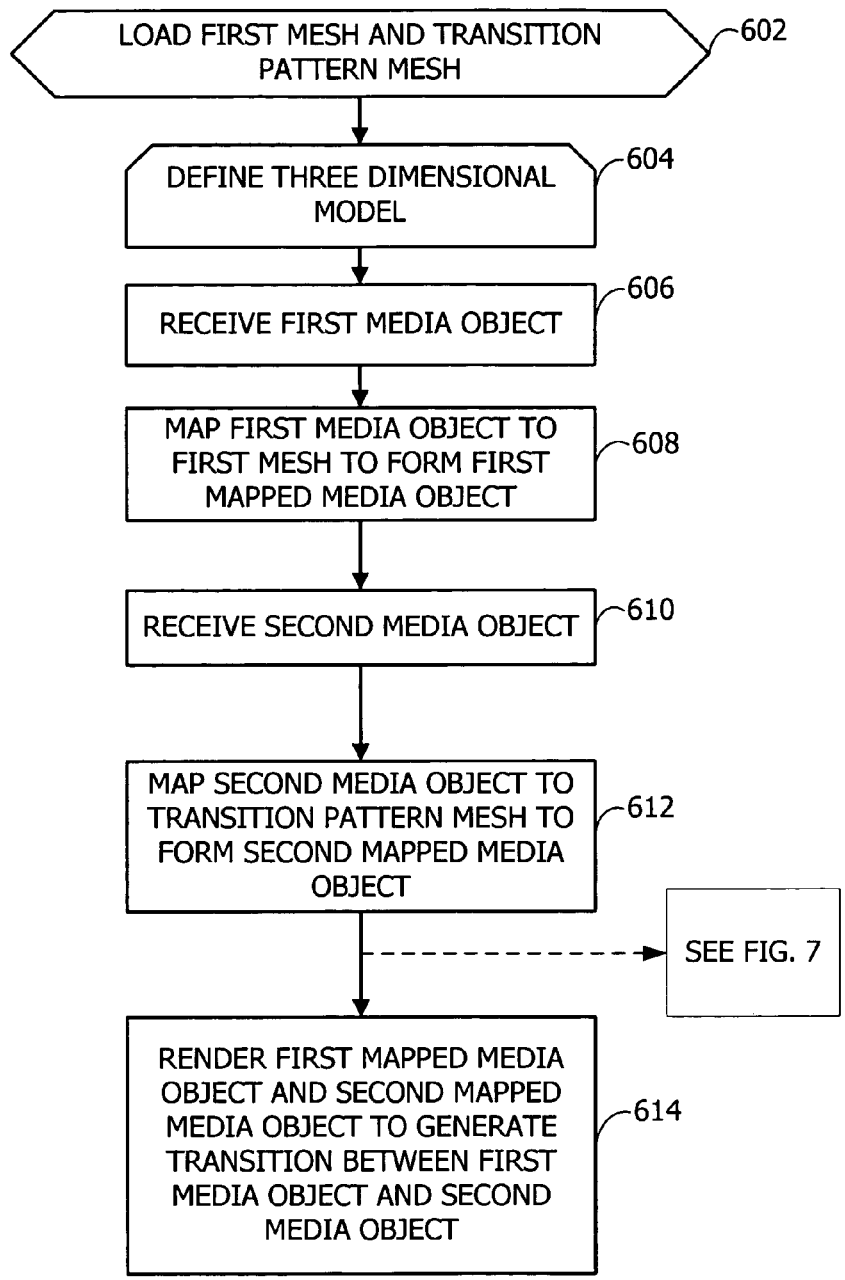
FIG. 6 is a flow chart illustrating a method for generating a two dimensional transition between a first media object and a second media object with a sharp edge of transition patterns according to one embodiment of the invention.

In one embodiment, embodiments of the present invention create additional effects along with the transitions. For example, transitions depicted in FIGS. 3B-C and FIGS. 4A-B show sharp edges of the transition patterns as the transition patterns change from the first media objects to the second media objects. FIG. 6 is a flow chart illustrating a method for generating a 2D transition between a first media object and a second media object with a sharp edge of transition patterns according to one embodiment of the invention. Initially, at 602, system 100 loads first mesh (e.g., first mesh 102) and a transition pattern mesh (e.g., transition pattern mesh 110). For example, the interface 108 receives a transition pattern mesh (e.g., circle-in, zigzag, or the like) from a user after selecting from a collection of transition patterns provided by a software application or supplied from other sources. At 604, system 100 defines a 3D model for generating the selected 2D transition. For example, by using model 200 and orthogonal transform 214, system 100 defines animation loop for progress from 0.0 to 1.0, as defined transform 214.

At 606, interface 108 receives a first media object, as an outgoing media object (e.g., first media object 304). The transition generator 112 maps the first media object to the first mesh to form a first mapped media object at 608. The interface 108 receives a second media object (e.g., second media object 306) at 610 and the transition generator 112 maps the second media object to the selected/received transition pattern mesh from the interface 108 at 612 (See descriptions of FIGS. 3A-G for an example of an implementation of mapping). The second processor 118 next renders the transition (e.g., transition 126) between the first media object and the second media object from the first mapped media object and the second media object at 614. For example, in rendering, second processor 118 first calculates data relating to vertices, pixels, and/or texture of the first mapped media object and the second media object before the transition takes place. The second processor 118 next calculates the data as a function of progress, i.e., as the transition 126 progresses in changing first media object 102 to second media object 104. Upon completion of calculating the data, second processor 118 converts calculated data to formats to be displayed on display 120. For example, display 120 may be a computer monitor with aspect ratio 4×3 and second processor 118 may convert the calculated data suitable to display the transition 126 on display 120 with aspect ratio 4×3. As a result, after rendering, display 120 displays the transition 126 transitioning from first media object 102 to second media object 104. See section 3 of the Appendix A describes one implementation of creating sharp edges.

As discussed, embodiments of the present invention create additional effects to transitions between media objects, in addition to generating transitions using a 3D model. For example, embodiments of the present invention may soften the edge during the transition as the first media object intersects the second media object.

To soften the hard or sharp edge by previous techniques, alpha blending techniques may be used. For example, interface 108 receives an alpha map 128 for softening sharp edges of transition patterns. In one embodiment, second processor 118 receives and processes parameters, such as per-primitive (material alpha) parameters, per-vertex (vertex alpha) parameters, per-pixel alpha (texture, frame buffer and render target alpha) parameters, or the like alpha blending parameters. Through alpha blending techniques, alpha values decrease gradually around the edge where the first media object and the second media object intersects. In one embodiment, the alpha map is used for storing alpha values.

Figure 9A:
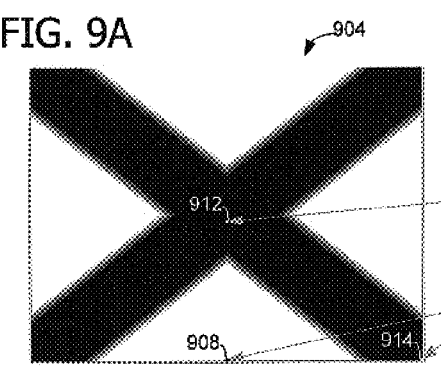
FIGS. 9A-D are diagrams illustrating an example of an alpha map according to one embodiment of the invention.
Figure 9B:
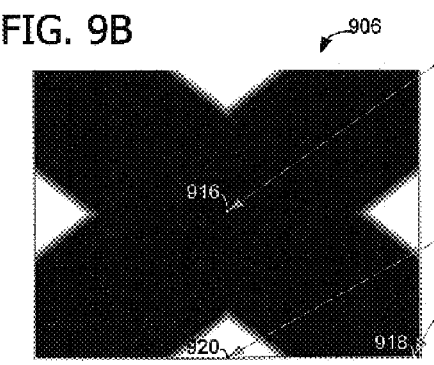
Figure 9C:
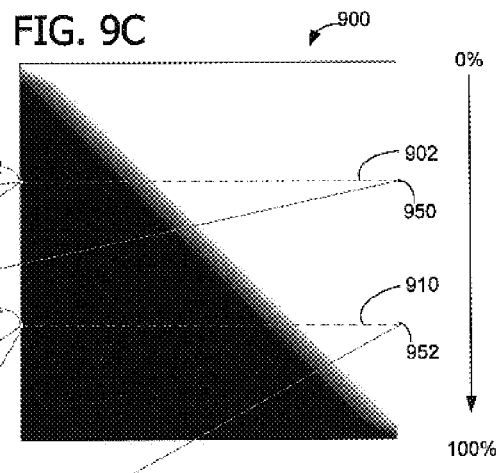

FIGS. 9A-D are diagrams illustrating an example of the use of an alpha map 900 according to one embodiment of the invention. An object 904 in FIG. 9A shows a diagonal cross transition at 30% transition progress while an object 906 in FIG. 9B shows the same diagonal cross transition at 70% transition progress. At 30% progress, alpha values along a line 902 are selected to define the transition progress. For example, the alpha value at point 922 defines the transition progress value for two corresponding points 912 and 914 in object 904 in FIG. 9A. Similarly, the alpha value at point 950 defines the transition progress value for a corresponding point 908 in object 904 in FIG. 9A. It is to be understood that an alpha value in alpha map 900 may be used to represent one or more corresponding points during the rendering of first media object 102 and second media object 104. It is also to be understood that, while FIGS. 9A-C are depicted with shades of black and white colors, other color shadings and/or degrees of color textures may be used without departing from the scope of the present invention.

At 70% progress, alpha values along a line 910 are selected to define the transition progress. For example, the alpha value at point 924 defines the transition progress value for two corresponding points 916 and 918 in object 906 in FIG. 9B. Similarly, the alpha value at point 952 defines the transition progress value for a corresponding point 920 in object 906 in FIG. 9B. It is to be understood that as the transition progresses, another line indicative of the transition progress would indicate where the alpha values are to be selected from alpha map 900.

Figure 9D:
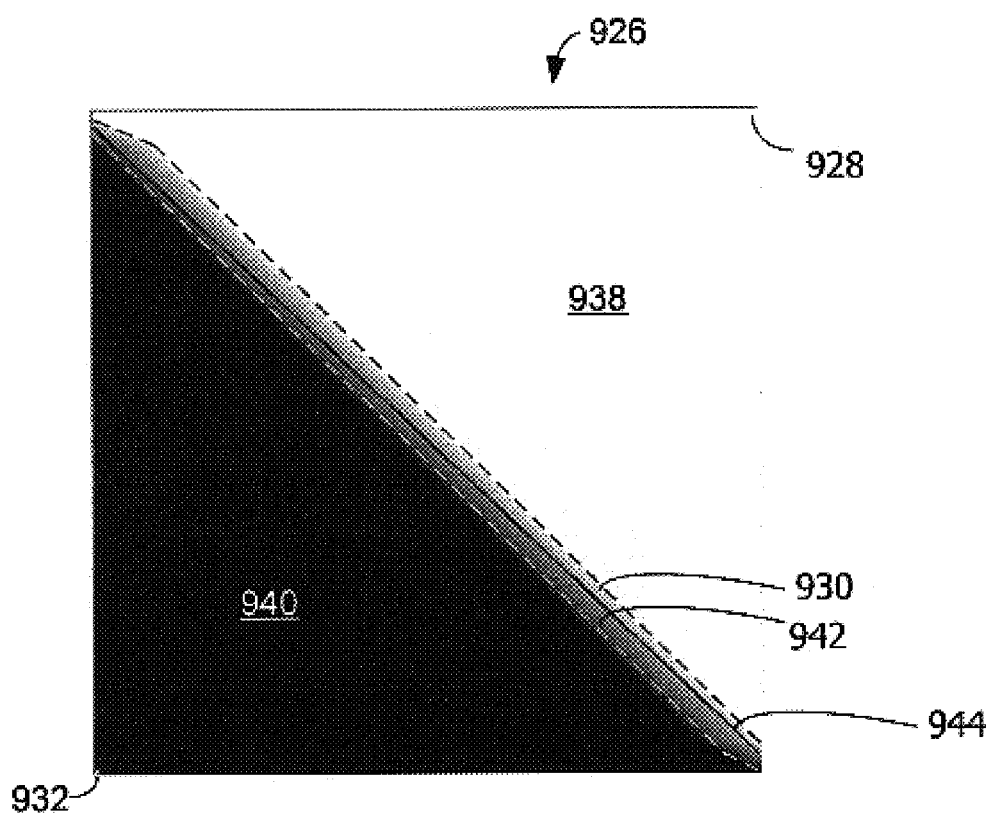

FIG. 9D illustrates a gradient translucent area in an alpha map 926 according to one embodiment of the invention. The alpha map 926 includes three areas: an opaque area 938, a transparent area 940 and a gradient translucent area where first media object 102 and second media object 104 blend together (defined by the dashed box). In alpha map 926, alpha values at a point 928 include values corresponding to a color shading of 100% white and 0% black while alpha values at a point 932 include values corresponding to a color shading of 0% white and 100% black. A diagonal line 944 dividing alpha map 926 shows a 50% shading of white and 50% shading of black. A 5% width area (enclosed by the dashed lines) illustrates the area where alpha values corresponding to a color shading of 50% white and 50% black may be selected. For example, alpha values in areas 930 and 942 may have values corresponding to 50% of white. In one embodiment, the width of gradient translucent area may be within a range of 0% to 50%. For example, at 0% width of the gradient translucent area, there is no gradient translucent area and as a result, alpha values in alpha map 926 include either values corresponding to 100% white or 0% white. Alternatively, at 50% width, alpha values in alpha map 926 would all include values corresponding to 50% white. By defining varying the width of the gradient translucent area of alpha map 926, embodiments of the present invention may select alpha values in alpha map 926 to produce a soft edge effects in two dimensional transitions. Section 5 of the Appendix A describes an exemplary implementation of the alpha map.

FIG. 7 is a flow chart illustrating a method for creating additional effects which are part of the transition between the first media object and the second media object according to one embodiment of the invention. FIG. 7 describes alternative embodiments of the present invention for using alpha blending techniques. It is to be understood that steps 602 to 612 are also common to FIG. 7. In an alternative embodiment, an alpha map is received at 714. As a result, second processor 118 renders transition 126 between first media object 102 and second media object 104 from the first mapped media object, the second mapped media object and the alpha map. In this case, second processor 118 renders the alpha map in addition to rendering the first mapped media object and the second mapped media object as described above. Using screen shot 406 of FIG. 4B as an example, the texture or the shading of the first mapped media object is distinct from that of the second mapped media object. In rendering the first mapped media object and the second mapped media object with the alpha map, second processor 118 softens the edge where the first and second mapped objects intersects by calculating the alpha values corresponding to the pixels along an edge intersecting the first media object and the second media object as a function of the alpha map. As the second processor 118 calculates the data from the first mapped media object and the second mapped media object 104 as a function of progress, the calculated alpha values are applied to replace the pixels along the edge of intersection. When the second processor 118 completes applying the pixels, the second processor 118 converts the pixels, in addition to calculated data from the first mapped media object and the second mapped media object, to display 120 for display. Section 4 of the Appendix A describes an implementation of softening the edge between the intersection of the first media object and the second media object.

In a further alternative embodiment, a dissolve blending technique is applied to the edge intersecting between the first media object and the second media object. For example, this technique requires two rendering processes by second processor 118. The second processor first renders transition pattern mesh 110 to generate a dissolve map having dissolved alpha values. In the second rendering process, second processor 118 renders the first mapped media object and the second mapped media object with the dissolve map. In other words, similar to rendering with the alpha map, second processor 118 generates a separate dissolve map having dissolved alpha values to be rendered with the first mapped media object and the second media object.

In another embodiment, both an alpha blending technique and a dissolve blending technique may be used. For example, alpha values from the alpha map are retrieved as in the alpha blending technique. Next, a dissolve map is created having dissolved alpha values and calculated with the alpha values from the alpha map to fashion the dissolve blending effect. For example, the calculation is done by applying the ADDSIGNED operation (e.g., ADDSIGNED calculates Alpha 1 (from alpha map)+Alpha 2 (from dissolve map)−0.5) and restricts result between 0 and 1. In another embodiment, only pixels with calculated alpha value larger than 0.25 are displayed as part of the transition. In this example, although these pixels are not displayed, the calculated alpha values are stored for other uses (e.g., storing them in a stencil buffer). Section 8 of the Appendix A describes an implementation of a dissolving edge technique.

Alternatively, in one embodiment, interface 108 receives a third media object at 718. For example, in addition to alpha blending, dissolve blending or soft edge techniques, a user may create an edge consisting of texture or shading data that is different from the texture or shading of the first media object and/or the second media object. As such, transition generator 112 maps the third media object to the transition pattern mesh to form a third mapped media object at 720. The second processor 118 renders the transition between the first media object and the second media object from the first mapped media object, the second mapped media object, the third mapped media object at 716. Section 6 of the Appendix A describes an implementation of creating a transition using a third media object.

In yet another embodiment, second processor 118 renders transitions to incorporate techniques, such as alpha blending, dissolve blending, soft edge, sharp edge, third media object blending, or a combination of above-described techniques. For example, a user may create a transition by a combination of a third media object blending technique and a sharp edge technique to control which pixel will be eventually displayed. In this example, transition generator 112 maps the third media object to form a third mapped media object in addition to mapping the second media object to form a second mapped media object. Next, transition generator 112 places the second mapped media object behind the third mapped media object (e.g., in negative z-coordinate direction with the amount of current animation progress). That is, the vertices or pixel values of the second mapped media object are mapped behind the vertices or pixel values of the third mapped media object so that the user may only see pixels of the third mapped media object. Next, transition generator 112 uses the third mapped media object to replace pixels where first media object and second media object intersect. In other words, unlike alpha or dissolve blending techniques described earlier, the third media object blending technique uses a third media object to replace texture values of pixels along the edge where first media object 102 and second media object 104 intersect. Hence, when second processor 118 renders the transition between the first media object, the second media object using the third media object, the user sees on display 120 the third media object along the edge where the first media object and the second media object intersects. In one embodiment, the width of the third mapped media object starts narrow and grows wider as the animation of the transition 126 progresses. Section 7 of the Appendix A describes an implementation of transition effects described above.

In another example of using a combination of techniques described above, a combination of a soft edge technique and a third media object blending technique may be used. In one embodiment, second processor 118 first renders second mapped media object and then renders the third mapped media object or vice versa. The alpha values of the alpha map are used blend the pixels of the edge where the third mapped media object intersects with the first media object and/or the second media object.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above systems and methods without departing from the scope of the invention, it is intended that all matter contained in the above description and shown in the accompanying drawings shall be interpreted as illustrative and not in a limiting sense.

APPENDIX A

Section 1: Geometry generation sample code.

Based on the "Inset" wipe pattern we want to generate, we have the transition pattern at 25%, 50% and 75% as cross-sections. Stack them up and connect vertices, we can get a model like this. X is the width of the output; Y is the height of the output; Z is the progress of the transition.

```
const DWORD VERTEX_XYZ_TEX2::FVF = D3DFVF_XYZ | D3DFVF_TEX2;
m_dwNumPatternIndices = 6;
m_dwNumPatternVertices = 4;
D3DXCreateMeshFVF(                  // DirectX API to create a
                                    D3DXMeshobject with:
   m_dwNumPatternIndices / 3,       // Number of Faces / triangles
   m_dwNumPatternVertices,          // Number of Vertices
   D3DXMESH_SYSTEMMEM,              // Create D3DXMesh in system memory
   VERTEX_XYZ_TEX2::FVF,            // Vertex format: XYZ position and
2 sets texture coordinates
   pd3dDevice,                      // Instance of GPU process
   &pSysMemMesh                     // return D3DXMESH pointer
);
VERTEX_XYZ_TEX2* pVertices = NULL;
pSysMemMesh->LockVertexBuffer( D3DLOCK_NOSYSLOCK,
(void**)&pVertices );
// Get VertexBuffer from D3DXMesh object.
// Fill in vertices with hard-coded (x, y, z) coordinates base on
the drawing above.
pVertices[0].v.x   = 1.0f;
pVertices[0].v.y   = 1.0f;
pVertices[0].v.z   = 1.0f;
// Make (t0.x, t0.y) = (x, y) and (t1.x, t1.y) = (z, Progress)
pVertices[0].t0.x  = pVertices[0].v.x;
pVertices[0].t0.y  = pVertices[0].v.y;
```

```
pVertices[0].t1.x   = pVertices[0].v.z;
pVertices[0].t1.y   = 0.50f; // Progress
pVertices[1].v.x    = 0.0f;
pVertices[1].v.y    = 1.0f;
pVertices[1].v.z    = 0.0f;
pVertices[1].t0.x   = pVertices[1].v.x;
pVertices[1].t0.y   = pVertices[1].v.y;
pVertices[1].t1.x   = pVertices[1].v.z;
pVertices[1].t1.y   = 0.50f; // Progress
pVertices[2].v.x    = 0.0f;
pVertices[2].v.y    = 0.0f;
pVertices[2].v.z    = 1.0f;
pVertices[2].t0.x   = pVertices[2].v.x;
pVertices[2].t0.y   = pVertices[2].v.y;
pVertices[2].t1.x   = pVertices[2].v.z;
pVertices[2].t1.y   = 0.50f; // Progress
pVertices[3].v.x    = 1.0f;
pVertices[3].v.y    = 0.0f;
pVertices[3].v.z    = 1.0f;
pVertices[3].t0.x   = pVertices[3].v.x;
pVertices[3].t0.y   = pVertices[3].v.y;
pVertices[3].t1.x   = pVertices[3].v.z;
pVertices[3].t1.y   = 0.50f; // Progress pSysMemMesh->UnlockVertexBuffer();
// Inform Direct3D this mesh object can be swapped out; it is not
in use now.

WORD* pIndices = NULL;
pSysMemMesh->LockIndexBuffer( D3DLOCK_NOSYSLOCK,
(void**)&pIndices);
// Get Index Buffer from D3DXMesh object.
```

```
// Fill in indices (in clockwise order).
// Triangle 1
pIndices[0] = 0;
pIndices[1] = 1;
pIndices[2] = 3;
// Triangle 2
pIndices[3] = 1;
pIndices[4] = 2;
pIndices[5] = 3;

pSysMemMesh->UnlockIndexBuffer();
// Created a CDXUTMesh object to manage D3DXMesh objects in
system memory and device memory.
*ppMesh = new CDXUTMesh( L"CInsetPatternMesh" );

(*ppMesh)->m_pSysMemMesh = pSysMemMesh.Detach();
// Put the D3DXMesh object created earlier in manage by
CDXUTMesh.
```

Section 2: Mesh generation sample code.

Mesh is created as DXUTMesh object.

Each DXUTMesh object manages 2 D3DXMesh objects; one in system memory (which the CPU has access to) and another one in device memory (which the GPU/display adapter has access to). Every time changes are made to the D3DXMesh object in system memory, the application needs to download it to the device memory. Otherwise the GPU will reuse the D3DXMesh object for every drawing command. The content of both D3DXMesh objects are the same. It includes one Vertex buffer and one Index buffer.

Vertex buffer is an array of vertices. The wipe transition, for example, defines which data is included in the vertex.

Each vertex has 3 entries, such as the example given below:

A 3D coordinate, (x, y, z) is for vertex position. Each vertex position is calculated base on a geometry shape, such as circle, star, heart, and so on.

A 2D texture coordinate, (tu1, tv1) is to direct GPU or a set of instructions where on the video source to look up for red/green/blue (RGB) value for a vertex. In the wipe transition example, tu1 is assigned to the x value; tv1 is assigned to the y value.

And a second 2D texture coordinate, (tu2, tv2) is to direct GPU or a set of instructions where on the alpha map to look up for an alpha value for this vertex; tu2 is assigned to z value; tv2 will be assigned to progress % value at run time / animation time.

An index buffer is an array of integer indices. Each index is indexed into the vertex buffer. Every 3 indices will form a triangle. All the triangles will form one 3D model.
Other 3D modeling tools like Maya® by Alias can be used to create .X files. When loading .X files created, normalization of each (x, y, z) coordinate may be necessary by scaling the 3D model to fit a visible area in 0.0 and 1.0 range.

Section 3: Sharp edge sample code.

```
// Setup Direct3D states
// pd3dDevice is an instance pointer of Direct3D / GPU.
pd3dDevice->SetRenderState( D3DRS_ALPHATESTENABLE, FALSE); // No
need to perform Alpha Test.
pd3dDevice->SetRenderState( D3DRS_ALPHABLENDENABLE,FALSE); // No
need to perform Alpha Blending.
pd3dDevice->SetRenderState( D3DRS_STENCILENABLE, FALSE); // No
need to perform Stencil Test.
```

```cpp
pd3dDevice->SetRenderState( D3DRS_ZENABLE, D3DZB_TRUE); // Enable
Depth Test
pd3dDevice->SetRenderState( D3DRS_ZWRITEENABLE,TRUE);   // Save Z
value in Depth buffer
// Setup Direct3D Texture Blending states.
// Direct3D allows up to 8 stages, but we need only 1.
pd3dDevice->SetTextureStageState( 0, D3DTSS_TEXCOORDINDEX , 0 );
// Use t0 texture coordinate for stage 0.
pd3dDevice->SetTextureStageState( 0, D3DTSS_COLOROP,
D3DTOP_SELECTARG1);
// Output RGB value pd3dDevice->SetTextureStageState( 0,
D3DTSS_COLORARG1, D3DTA_TEXTURE );
// Output RGB value from texture.
pd3dDevice->SetTextureStageState( 0, D3DTSS_ALPHAOP,
D3DTOP_DISABLE );
// No Alpha output from stage 0 and above pd3dDevice-
>SetTextureStageState( 1, D3DTSS_COLOROP,   D3DTOP_DISABLE );
// No RGB output from stage 1 and above.

// Draw In-Coming source
// Use texture 2 and First mesh
pd3dDevice->SetTexture(0, pTextureIn);
// pTextureIn is a Texture object stores in-coming video frame.
// Set this texture to texture blending stage 0.
LPD3DXMESH pPlaneMesh = m_pPlaneMesh->GetLocalMesh(); // Get
D3DXMesh
object stored in device/GPU memory from CDXUTMesh.
pPlaneMesh->DrawSubset( 0 ); // Have D3D/GPU execute a draw use
this PlaneMesh, TextureIn and current settings.
// Draw Out-going source
// Use texture 1 and Transition pattern mesh
```

```
// Apply translate transform matrix to move transition pattern
mesh lower in z direction.
D3DXMATRIX matTranslation;
D3DXMatrixTranslation( &matTranslation, 0, 0, -fltProgress);
// Create a translate transform matrix to move PatternMesh lower
in z direction.
pd3dDevice->SetTransform( D3DTS_WORLD, &matTranslation );
// Set D3D world transform matrix.
// D3D World transform convert model space coordinates to world
space.
// (0, 0, 0) in Transition pattern mesh becomes (0, 0, -
fltProgress)
pd3dDevice->SetTexture(0, pTextureOut);
LPD3DXMESH pPatternMesh = m_pPatternMesh->GetLocalMesh();
pPatternMesh->DrawSubset( 0 ); // Have D3D/GPU execute a draw use
this PatternMesh, TextureOut and current settings.
This routine gets repeated for each frame. fltProgress is
calculated base on transition duration, frame rate, and current
frame.
When D3D / GPU draws first mesh / in-coming video source, it puts
the whole TextureIn to the render target surface and also set z
value to depth buffer for each pixel in render target surface.

When D3D / GPU draws transition pattern mesh / out-going video
source, it will perform depth test. It compares the z value of
the transition pattern mesh pixel with the z value of that pixel
in depth buffer. Pixels farther from viewer will be dropped.
```

Section 4: Soft edge sample code.

```
// Draw In-Coming Video Source first.
// Setup Direct3D states
// pd3dDevice is an instance pointer of Direct3D / GPU.
```

```
pd3dDevice->SetRenderState( D3DRS_SHADEMODE, D3DSHADE_GOURAUD);
// Set to Smooth Shading mode.  So D3D / GPU will calculate
texture coordinate at each vertex then perform interpolation
among 3 vertices of each triangle to calculate texture coordinate
of each pixel within that triangle.  That texture coordinate will
later be used to look up RGB and Alpha values from selected
texture.

pd3dDevice->SetRenderState( D3DRS_ALPHATESTENABLE, FALSE); // No
need to perform Alpha Test.
pd3dDevice->SetRenderState( D3DRS_ALPHABLENDENABLE,FALSE); // No
need to perform Alpha Blending.
pd3dDevice->SetRenderState( D3DRS_STENCILENABLE,  FALSE); // No
need to perform Stencil Test.
pd3dDevice->SetRenderState( D3DRS_ZENABLE, D3DZB_FALSE); // No
Need for Depth Test
pd3dDevice->SetRenderState( D3DRS_ZWRITEENABLE,  FALSE); // No
Need to Save Z value in Depth buffer // Setup Direct3D Texture Blending states.
// Direct3D allows up to 8 stages, but we need only 1.

// Look up RGB value for each Vertex from (tu1, tv1) of
pTextureIn.
pd3dDevice->SetTextureStageState( 0, D3DTSS_TEXCOORDINDEX , 0 );
// Use tu1, tv1 texture coordinate for stage 0.
pd3dDevice->SetTextureStageState( 0, D3DTSS_COLOROP,
D3DTOP_SELECTARG1); // Output RGB value
pd3dDevice->SetTextureStageState( 0, D3DTSS_COLORARG1,
D3DTA_TEXTURE ); // Output RGB value from texture.
pd3dDevice->SetTextureStageState( 0, D3DTSS_ALPHAOP,
D3DTOP_DISABLE ); // No Alpha output from stage 0 and above
```

```cpp
pd3dDevice->SetTextureStageState( 1, D3DTSS_COLOROP,
D3DTOP_DISABLE );
// No RGB output from stage 1 and above.

// Draw In-Coming source
// Use texture 2 and First mesh pd3dDevice->SetTexture(0, pTextureIn);
// pTextureIn is a Texture object stores in-coming video frame.
// Set this texture to texture blending stage 0.

LPD3DXMESH pPlaneMesh = m_pPlaneMesh->GetLocalMesh(); // Get
D3DXMesh
object stored in device/GPU memory from CDXUTMesh.
pPlaneMesh->DrawSubset( 0 ); // Have D3D/GPU execute a draw use
this PlaneMesh, TextureIn and current settings.

// Draw Out-going source

// Setup Render State
// Setup for Alpha Blending operation.
pd3dDevice->SetRenderState( D3DRS_ALPHABLENDENABLE, TRUE );
pd3dDevice->SetRenderState( D3DRS_SRCBLEND, D3DBLEND_SRCALPHA );
pd3dDevice->SetRenderState( D3DRS_DESTBLEND, DBLEND_INVSRCALPHA);

// Texture Blending
// Stage 0 :
// ColorOp : Select Texture
// AlphaOp : Current
// Look up RGB value for each Vertex from (tu1, tv1) of
pTextureOut.
pd3dDevice->SetTextureStageState( 0, D3DTSS_TEXCOORDINDEX , 0 );
```

```
pd3dDevice->SetTextureStageState( 0, D3DTSS_COLOROP,
D3DTOP_SELECTARG1);
pd3dDevice->SetTextureStageState( 0, D3DTSS_COLORARG1,
D3DTA_TEXTURE );
// Not Setting Alpha value.
pd3dDevice->SetTextureStageState( 0, D3DTSS_ALPHAOP,
D3DTOP_SELECTARG1);
pd3dDevice->SetTextureStageState( 0, D3DTSS_ALPHAARG1,
D3DTA_CURRENT );

// Stage 1 :
// ColorOp : Current
// AlphaOp : Select Texture
RTN_HR_IF_FAILED(pd3dDevice->SetTexture(1, m_pAlphaMapTexture));
// No change of RGB value from previous stage.
pd3dDevice->SetTextureStageState( 1, D3DTSS_TEXCOORDINDEX , 1 );
pd3dDevice->SetTextureStageState( 1, D3DTSS_COLOROP,
D3DTOP_SELECTARG1);
pd3dDevice->SetTextureStageState( 1, D3DTSS_COLORARG1,
D3DTA_CURRENT );
// Look up Alpha value for each Vertex from (tu2, tv2) of
pAlphaMapTexture.
pd3dDevice->SetTextureStageState( 1, D3DTSS_ALPHAOP,
D3DTOP_SELECTARG1);
pd3dDevice->SetTextureStageState( 1, D3DTSS_ALPHAARG1,
D3DTA_TEXTURE );

// Stage 2 : Disable
pd3dDevice->SetTextureStageState( 2, D3DTSS_ALPHAOP,
D3DTOP_DISABLE);
pd3dDevice->SetTextureStageState( 2, D3DTSS_COLOROP,
D3DTOP_DISABLE );
```

```
pd3dDevice->SetSamplerState( 0, D3DSAMP_MINFILTER, D3DTEXF_LINEAR
);
pd3dDevice->SetSamplerState( 0, D3DSAMP_MAGFILTER,
D3DTEXF_LINEAR);

pd3dDevice->SetSamplerState( 1, D3DSAMP_MINFILTER,
D3DTEXF_LINEAR);
pd3dDevice->SetSamplerState( 1, D3DSAMP_MAGFILTER,
D3DTEXF_LINEAR);

pd3dDevice->SetSamplerState(1, D3DSAMP_ADDRESSU,
D3DTADDRESS_CLAMP);
pd3dDevice->SetSamplerState(1, D3DSAMP_ADDRESSV,
D3DTADDRESS_CLAMP );

// Set tv2 of each vertex of Transition pattern mesh to Progress
VERTEX_XYZ_TEX2* pVertices = NULL;
pSysMemMesh->LockVertexBuffer( D3DLOCK_NOSYSLOCK,
(void**)&pVertices );

DWORD dwNumPatternVertices = pSysMemMesh->GetNumVertices();
for(DWORD i = 0; i < dwNumPatternVertices; i++)
   pVertices[i].t2.y  = fltProgress; // Progress
// fltProgress is calculated base on transition duration, frame
rate, and current frame.

pSysMemMesh->UnlockVertexBuffer();
m_pMesh->InvalidateDeviceObjects();
m_pMesh->RestoreDeviceObjects(pd3dDevice);
// RestoreDeviceObjects() will create Local Mesh
```

```
// Use texture 1 and Transition pattern mesh
pd3dDevice->SetTexture(0, pTextureOut);
// pTextureOut is a Texture object stores Out-Going video frame.
// Set this texture to texture blending stage 0.

LPD3DXMESH pPatternMesh = m_pPatternMesh->GetLocalMesh();
pPatternMesh->DrawSubset( 0 ); // Have D3D/GPU execute a draw use
this PatternMesh, TextureOut and current settings.
```

The routine described above gets repeated for each frame. When D3D / GPU draws the first mesh / incoming video source, it puts the whole TextureIn to the render target surface. When D3D / GPU draws transition pattern mesh / out-going video source, it will look up Alpha value from alpha map and used it in the Alpha Blending calculation with RGB value from TextureOut and RGB value is in the render target.

Section 5: Alpha map generation sample code.

Each Vertex includes position and color information.
The Top-Right corner (1, 0) is Opaque. The Bottom-Right corner (0, 1) is Transparent. From Top-Left to Bottom Right line is 50% transparent. The gradient from Transparent to Opaque follows a sine curve. Render this Mesh to a texture and we have the alpha map will use for create soft edge. The alpha map for Burn Edge has the same shape but different color / alpha values. The Top-Right corner (1, 0) and Bottom-Right corner (0, 1) are Transparent. From Top-Left to Bottom Right line has transparency set by burn edge intensity.

```
struct ALPHAMAPVERTEX
{
    D3DXVECTOR3 v;         // Position
    D3DCOLOR    color;     // The color
    static const DWORD FVF;
```

```
};
const DWORD ALPHAMAPVERTEX::FVF = D3DFVF_XYZ | D3DFVF_DIFFUSE;
        m_wNumSegments = 36;
        m_dwNumVertice
                = 2 // Top-left and bottom-right
                + (m_wNumSegments + 1) * 3; // 3: left -
middle - right
        m_dwNumIndices
                = 2 * 4
                + (m_wNumSegments - 1) * 6;
        m_dwNumIndices *= 3;
D3DXCreateMeshFVF(
        m_dwNumIndices / 3, // Number of Faces,
        m_dwNumVertices,    // Number of Vertices,
        D3DXMESH_SYSTEMMEM, // Save in System Memory,
        ALPHAMAPVERTEX::FVF,// Vertex Format,
        pd3dDevice,         // GPU Instance,
        &pSysMemMesh        // Return LPD3DXMESH
   );
// Lock VertexBuffer for writing.
ALPHAMAPVERTEX* pVertices = NULL;
pSysMemMesh->LockVertexBuffer( D3DLOCK_NOSYSLOCK,
(void**)&pVertices);
        D3DCOLOR clrRight;
        D3DCOLOR clrMiddle;
        D3DCOLOR clrLeft;
        if(m_Type == SoftEdge)
        {
                clrLeft = 0;
                clrMiddle = 0x80808080;
                clrRight = 0xffffffff;
        }
```

```
            else if(m_Type == BurnEdge)
            {
                    clrLeft = 0;
                    clrMiddle = D3DCOLOR_COLORVALUE
(m_fltBurnIntensity,m_fltBurnIntensity,m_fltBurnIntensity,m_fltBu
rnIntensity);
                    clrRight = 0;
            }
            else
            {
                    clrLeft = 0xffffffff;
                    clrMiddle = 0;
                    clrRight = 0xffffffff;
            }
            // Left-bottom
   pVertices[0].v.x    = 0.0f;
   pVertices[0].v.y    = 1.0f;
   pVertices[0].v.z    = 0.0f;
   pVertices[0].color = clrLeft;

// Right-top (For SoftEdge 100%; For Burn Edge 0)
   pVertices[1].v.x    = 1.0f;
   pVertices[1].v.y    = 0.0f;
   pVertices[1].v.z    = 0.0f;
   pVertices[1].color = clrRight;

// left-top
   pVertices[2].v.x    = 0.0f;
   pVertices[2].v.y    = 0.0f;
   pVertices[2].v.z    = 0.0f;
   pVertices[2].color = clrLeft;
   pVertices[3].v.x    = 0.0f;
```

```
pVertices[3].v.y    = 0.0f;
pVertices[3].v.z    = 0.0f;
pVertices[3].color  = clrMiddle;

pVertices[4].v.x    = 0.0f;
pVertices[4].v.y    = 0.0f;
pVertices[4].v.z    = 0.0f;
pVertices[4].color  = clrRight;

// right bottom
pVertices[5].v.x    = 1.0f;
pVertices[5].v.y    = 1.0f;
pVertices[5].v.z    = 0.0f;
pVertices[5].color  = clrLeft;

pVertices[6].v.x    = 1.0f;
pVertices[6].v.y    = 1.0f;
pVertices[6].v.z    = 0.0f;
pVertices[6].color  = clrMiddle;

pVertices[7].v.x    = 1.0f;
pVertices[7].v.y    = 1.0f;
pVertices[7].v.z    = 0.0f;
pVertices[7].color  = clrRight;

WORD index = 8; // 0 to 7 have been assigned above.

// Use a sin curve from 0 to 180 degree; sin value are 0
to 1 to 0.
    WORD i;
        for(i = 1; i < m_wNumSegments; i ++)
        {
```

```
FLOAT fltXY = (FLOAT)i / (FLOAT)m_wNumSegments;
FLOAT fltAngle = D3DX_PI * fltXY;
FLOAT fltDistance = ::sin(fltAngle);
fltDistance *= m_fltGradientWidth / 2.0f;
// Adjust width of gradient area.
// Check fltDistance range
if(fltXY < 0.5f)
// The Top half, so fltXY - fltDistance > 0
        fltDistance = min(fltXY, fltDistance);
else if(fltXY > 0.5f)
// The Bottom Half, so fltXY + fltDistance < 1
        fltDistance = min(1.0f - fltXY, fltDistance);
else
// The Middle, so fltXY + fltDistance < 1 and fltXY- fltDistance > 0
        fltDistance = min(0.5f, fltDistance);
// left
pVertices[index].v.x    = fltXY - fltDistance;
pVertices[index].v.y    = fltXY;
pVertices[index].v.z    = 0.0f;
pVertices[index].color = clrLeft;

// middle
pVertices[index + 1].v.x    = fltXY;
pVertices[index + 1].v.y    = fltXY;
pVertices[index + 1].v.z    = 0.0f;
pVertices[index + 1].color = clrMiddle;

// right
pVertices[index + 2].v.x    = fltXY + fltDistance;
```

```
                pVertices[index + 2].v.y    = fltXY;
                pVertices[index + 2].v.z    = 0.0f;
                pVertices[index + 2].color  = clrRight;

index += 3;
        }
        RTN_HR_IF_FAILED( pSysMemMesh->UnlockVertexBuffer());
        // Lock IndexBuffer for writing.
        WORD* pIndices = NULL;
        RTN_HR_IF_FAILED( pSysMemMesh-
>LockIndexBuffer(D3DLOCK_NOSYSLOCK, (void**)&pIndices));
            RTN_HR_IF_BADPTR(pIndices);
// Fill in indices
// Left most
pIndices[0] = 2;
pIndices[1] = 8;
pIndices[2] = 0;

// Left center
pIndices[3] = 3;
pIndices[4] = 9;
pIndices[5] = 8;

// right center
pIndices[6] = 3;
pIndices[7] = 10;
pIndices[8] = 9;

// Draw top most last to make sure top scan line is all
opaque.
        index = 9;
        for(i = 1; i < m_wNumSegments - 1; i ++)
```

```
{
    // To left
    pIndices[index + 0] = 0;
    pIndices[index + 1] = i * 3 + 5;
    pIndices[index + 2] = i * 3 + 8;

// left quad
    pIndices[index + 3] = i * 3 + 5;
    pIndices[index + 4] = i * 3 + 6;
    pIndices[index + 5] = i * 3 + 8;

pIndices[index + 6] = i * 3 + 6;
    pIndices[index + 7] = i * 3 + 9;
    pIndices[index + 8] = i * 3 + 8;

// right quad
    pIndices[index + 9] = i * 3 + 6;
    pIndices[index + 10] = i * 3 + 7;
    pIndices[index + 11] = i * 3 + 9;

pIndices[index + 12] = i * 3 + 7;
    pIndices[index + 13] = i * 3 + 10;
    pIndices[index + 14] = i * 3 + 9;

// To right
    pIndices[index + 15] = 1;
    pIndices[index + 16] = i * 3 + 10;
    pIndices[index + 17] = i * 3 + 7;

index += 18;
}
// right most
```

```
        pIndices[index + 0] = 7;
        pIndices[index + 1] = i * 3 + 7;
        pIndices[index + 2] = 1;

// right center
        pIndices[index + 3] = 6;
        pIndices[index + 4] = i * 3 + 6;
        pIndices[index + 5] = i * 3 + 7;

// left center
        pIndices[index + 6] = 6;
        pIndices[index + 7] = i * 3 + 5;
        pIndices[index + 8] = i * 3 + 6;

// bottom most
        pIndices[index + 9] = 5;
        pIndices[index + 10] = 0;
        pIndices[index + 11] = i * 3 + 5;

// Top most
        pIndices[index + 12] = 4;
        pIndices[index + 13] = 1;
        pIndices[index + 14] = 10;
}
    RTN_HR_IF_FAILED( pSysMemMesh->UnlockIndexBuffer() );
    // Created a CDXUTMesh object to manage D3DXMesh objects in
    system memory and device memory.
    m_pMesh = new CDXUTMesh( L"CAlphaMap" );
        RTN_HR_IF_BADNEW(m_pMesh);

m_pMesh->m_pSysMemMesh = pSysMemMesh.Detach();
```

```
// Put the D3DXMesh object created earlier in manage by
CDXUTMesh.
    m_pMesh->RestoreDeviceObjects(pd3dDevice);
    // Create a copy in device memory.

#ifdef _DEBUG
// The MESH may be saved to a .X file.
    if(get_MeshFilename( ))
    {
        VERIFY_OK(SaveMesh(pd3dDevice, get_MeshFilename( )));
    }
#endif
    // Use 128 x 256 alpha map
    // to ensure the first scan line is all opaque.
    // and the last scanline is all transparent.
    CComPtr<IDirect3DSurface9> pSurfaceLevel;
    pd3dDevice->CreateRenderTarget(
        128, 256,              //UINT Width, UINT Height,
        D3DFMT_A8R8G8B8,       //Render Target Format,
        D3DMULTISAMPLE_NONE,   //D3DMULTISAMPLE_TYPE,
        D3DMULTISAMPLE_NONE,   //Multisample Quality,
        TRUE,                  //BOOL Lockable,
        &pSurfaceLevel,        // Return IDirect3DSurface9**
        ppSurface,
        NULL                   //HANDLE* pSharedHandle
    );
    // Have D3D/GPU Render to this surface.
    pd3dDevice->SetRenderTarget(0, pSurfaceLevel);

// Setup D3D States.
    pd3dDevice->SetRenderState( D3DRS_ALPHABLENDENABLE, TRUE );
```

```
pd3dDevice->SetRenderState( D3DRS_SRCBLEND, D3DBLEND_SRCALPHA
);
pd3dDevice->SetRenderState( D3DRS_DESTBLEND, D3DBLEND_ZERO );
// No need to blend exiting pixels.

pd3dDevice->SetRenderState(D3DRS_SHADEMODE, D3DSHADE_GOURAUD);
//Smooth Shading
pd3dDevice->SetRenderState(D3DRS_COLORWRITEENABLE,
        D3DCOLORWRITEENABLE_RED   | D3DCOLORWRITEENABLE_GREEN
        | D3DCOLORWRITEENABLE_BLUE |
        D3DCOLORWRITEENABLE_ALPHA );

D3DXMATRIX matWorld;
  D3DXMatrixIdentity( &matWorld );
pd3dDevice->SetTransform( D3DTS_WORLD, &matWorld ); // No
Scale/Translate/Rotate.

// Setup D3D Camera.
D3DXMATRIX matView;
D3DXVECTOR3 vFromPt   = D3DXVECTOR3( 0.5f, 0.5f, 10.0f );
D3DXVECTOR3 vLookatPt = D3DXVECTOR3( 0.5f, 0.5f, 0.0f );
D3DXVECTOR3 vUpVec    = D3DXVECTOR3( 0.0f, -1.0f, 0.0f );
D3DXMatrixLookAtLH( &matView, &vFromPt, &vLookatPt, &vUpVec );
pd3dDevice->SetTransform( D3DTS_VIEW, &matView );

D3DXMATRIX matProj;
D3DXMatrixOrthoLH( &matProj, 1.0f, 1.0f, 0.01f, 100.0f );
pd3dDevice->SetTransform( D3DTS_PROJECTION, &matProj );

// Setup D3D Texture Blending Stage States
pd3dDevice->SetTextureStageState( 0, D3DTSS_COLOROP,
D3DTOP_SELECTARG1 );
```

```
pd3dDevice->SetTextureStageState( 0, D3DTSS_COLORARG1,
D3DTA_DIFFUSE);
pd3dDevice->SetTextureStageState( 0, D3DTSS_ALPHAOP,
D3DTOP_SELECTARG1 );
pd3dDevice->SetTextureStageState( 0, D3DTSS_ALPHAARG1,
D3DTA_DIFFUSE);

pd3dDevice->SetTextureStageState( 1, D3DTSS_COLOROP,
D3DTOP_DISABLE );
pd3dDevice->SetTextureStageState( 1, D3DTSS_ALPHAOP,
D3DTOP_DISABLE );

RTN_HR_IF_BADNEW(m_pMesh);
LPD3DXMESH pMesh = m_pMesh->GetLocalMesh();
    RTN_HR_IF_BADNEW(pMesh);

// Clear the viewport
    pd3dDevice->Clear( 0L, NULL, D3DCLEAR_TARGET, 0x00000000,
1.0f, 0L);

// Begin the scene
pd3dDevice->BeginScene();
    HRESULT hr = S_OK;

// Execute Drawing
    pMesh->DrawSubset( 0 ));

// End the scene.
pd3dDevice->EndScene();

// Create a Texture to store the Alpha Map.
CComPtr<IDirect3DTexture9> pTexture;
```

```
        if(S_OK != pd3dDevice->CreateTexture(
            128, 256,    //UINT Width, UINT Height,
            1,           //MIP Levels,
            D3DUSAGE_DYNAMIC,
            D3DFMT_A8,   //Texture Format, Alpha only.
            D3DPOOL_DEFAULT, // Put in device memory.
            &pTexture,   // Return Texture
            NULL)        //HANDLE* pSharedHandle) ||
            || pTexture == NULL)
    {

// Failed to create A8 format texture
            // try A8R8G8B8 format. Use more memory.

pd3dDevice->CreateTexture(
                128, 256,
                1,
                D3DUSAGE_DYNAMIC,
                D3DFMT_A8R8G8B8,
                D3DPOOL_DEFAULT,
                &pTexture,
                NULL
            );
    }
CComPtr<IDirect3DSurface9> pDestSurfaceLevel;
    pTexture->GetSurfaceLevel(0/* First MIP Level*/,
    &pDestSurfaceLevel);
    // Copy RenderTarget pixels to Texture.
    D3DXLoadSurfaceFromSurface(
            pDestSurfaceLevel, //LPDIRECT3DSURFACE9 pDestSurface,
            NULL,              //CONST PALETTEENTRY *pDestPalette,
            NULL,              //CONST RECT *pDestRect,
            pSurfaceLevel,     //LPDIRECT3DSURFACE9 pSrcSurface,
```

```
            NULL,                   //CONST PALETTEENTRY *pSrcPalette,
            NULL,                   //CONST RECT *pSrcRect,
            D3DX_FILTER_POINT,      //DWORD Filter,
            0                       //D3DCOLOR ColorKey
    );
    *ppTexture = pTexture.Detach();
    // This Texture is the Alpha Map.

#ifdef _DEBUG
// The Alpha Map may be saved to a .dds or jpg file.
    D3DXSaveSurfaceToFile(
        _T(".\\Shared\\RuntimeAlphaMap.dds"),   //File Name
        D3DXIFF_DDS,                            //File Format,
        pDestSurfaceLevel,                      //Save this surface to file,
        NULL,                                   //NO PALETTEENTRY,
        NULL                                    //NO RECT; Whole surface
    );
#endif
```

Section 6: Burn edge sample code.

```
// After render wipe transition with sharp or soft edge
technique. Render Fancy Edge Texture to Transition pattern mesh
with burn edge alpha map. Burn Edge Alpha Map has the same shape
vertices arrangement as the alpha map of soft edge technique.
But the color arrangement is different. It is transparent to
both side of the top-left to bottom right line. The alpha value
of top-left to bottom right line is BurnIntensity. From the
center line alpha value reduce to 0 gradually.

// Setup Render State
pd3dDevice->SetRenderState( D3DRS_SHADEMODE, D3DSHADE_GOURAUD);
pd3dDevice->SetRenderState( D3DRS_ZENABLE, D3DZB_FALSE);
```

```
pd3dDevice->SetRenderState( D3DRS_ZWRITEENABLE, FALSE);
pd3dDevice->SetRenderState( D3DRS_ALPHATESTENABLE, FALSE);
pd3dDevice->SetRenderState( D3DRS_STENCILENABLE, FALSE);
pd3dDevice->SetRenderState( D3DRS_ALPHABLENDENABLE, TRUE );
pd3dDevice->SetRenderState( D3DRS_SRCBLEND,D3DBLEND_SRCALPHA );
pd3dDevice->SetRenderState(D3DRS_DESTBLEND,D3DBLEND_INVSRCALPHA);
if(m_enumFancyEdge != FancyEdgeColor && m_enumFancyEdge !=
FancyEdgeColors)
{
    pd3dDevice->SetRenderState( D3DRS_DESTBLEND, D3DBLEND_ONE );
    // So black pixels in fancy edge texture won't show up.
}
// Texture Blending
// Stage 0 :
// ColorOp : Select Texture
// AlphaOp : Current
pd3dDevice->SetTextureStageState( 0, D3DTSS_TEXCOORDINDEX , 0 );
pd3dDevice->SetTextureStageState( 0,
D3DTSS_COLOROP,   D3DTOP_SELECTARG1 );
pd3dDevice->SetTextureStageState( 0, D3DTSS_COLORARG1,
D3DTA_TEXTURE );
if(m_enumFancyEdge == FancyEdgeColor || m_enumFancyEdge ==
FancyEdgeColors)
{
    pd3dDevice->SetTextureStageState( 0, D3DTSS_COLORARG1,
    D3DTA_TFACTOR );
    // Get RGB value from RenderState TextureFactor.
}
pd3dDevice->SetTextureStageState( 0,
D3DTSS_ALPHAOP,   D3DTOP_SELECTARG1 );
pd3dDevice->SetTextureStageState( 0, D3DTSS_ALPHAARG1,
D3DTA_CURRENT );
```

```
// Stage 1 :
// ColorOp : Current
// AlphaOp : Select Texture
pd3dDevice->SetTexture(1, m_pAlphaMapTexture);
pd3dDevice->SetTextureStageState( 1, D3DTSS_TEXCOORDINDEX , 1 );
pd3dDevice->SetTextureStageState( 1,
D3DTSS_COLOROP,    D3DTOP_SELECTARG1 );
pd3dDevice->SetTextureStageState( 1, D3DTSS_COLORARG1,
D3DTA_CURRENT );
pd3dDevice->SetTextureStageState( 1,
D3DTSS_ALPHAOP,    D3DTOP_SELECTARG1 );
pd3dDevice->SetTextureStageState( 1, D3DTSS_ALPHAARG1,
D3DTA_TEXTURE );

// Stage 2 : Disable
pd3dDevice->SetTextureStageState( 2,
D3DTSS_ALPHAOP, D3DTOP_DISABLE );
pd3dDevice->SetTextureStageState( 2,
D3DTSS_COLOROP,    D3DTOP_DISABLE );

pd3dDevice->SetSamplerState( 0, D3DSAMP_MINFILTER, D3DTEXF_LINEAR
);
pd3dDevice->SetSamplerState( 0, D3DSAMP_MAGFILTER, D3DTEXF_LINEAR
);

pd3dDevice->SetSamplerState( 1, D3DSAMP_MINFILTER, D3DTEXF_LINEAR
);
pd3dDevice->SetSamplerState( 1, D3DSAMP_MAGFILTER, D3DTEXF_LINEAR
);
```

```
pd3dDevice->SetSamplerState(1, D3DSAMP_ADDRESSU,
D3DTADDRESS_CLAMP );
pd3dDevice->SetSamplerState(1, D3DSAMP_ADDRESSV,
D3DTADDRESS_CLAMP );

if(m_enumFancyEdge == FancyEdgeColor || m_enumFancyEdge ==
FancyEdgeColors)
{
    if(m_enumFancyEdge == FancyEdgeColors)
    {
        D3DXCOLOR clrStart( m_colorFancyEdgeStart );
        D3DXCOLOR clrStop( m_colorFancyEdgeStop );
        D3DXCOLOR clrOut( (DWORD)0 );

D3DXColorLerp(&clrOut, &clrStart, &clrStop,
        (FLOAT)fTime);

D3DCOLOR   clr =
        D3DCOLOR_COLORVALUE(clrOut.r,clrOut.g,clrOut.b,clrOut.a
        );
        pd3dDevice->SetRenderState( D3DRS_TEXTUREFACTOR, clr );
    }
    else
    {
        pd3dDevice->SetRenderState( D3DRS_TEXTUREFACTOR,
        m_colorFancyEdgeStart );
    }
}
else
{
    pd3dDevice->SetTexture(0, m_pFancyEdgeTexture);
}
```

```
pPatternMesh->DrawSubset( 0 );  // Have D3D/GPU execute a draw use
this PatternMesh, TextureOut with current settings.
```

Section 7: Fancy edge sample code.
```
FLOAT fltShift = m_fltGradientWidth;
if(m_fltGradientWidth == 0.0f)
{
      fltShift = 0.05f;
} fltProgress = (FLOAT)fTime;

if(m_fProgressShift)
{
      if(fltProgress > fltShift)
      {
            fltProgress = fltShift + fltProgress;
      }
      else
      {
            fltProgress *= 2.0f;
      }
}
```

In one embodiment, the transition pattern mesh is rendered twice through exactly the same process as the sharp / soft / dissolve edge techniques. The first pass renders fancy edge texture which can be a flame image or wave image. The second pass renders the outgoing video source with progress shifted with source code above.

Section 8: Dissolve edge sample code.
// Draw In-Coming Video Source first.

// Setup Direct3D states

// pd3dDevice is an instance pointer of Direct3D / GPU.

pd3dDevice->SetRenderState( D3DRS_ALPHATESTENABLE, FALSE); // No need to perform Alpha Test.

pd3dDevice->SetRenderState( D3DRS_ALPHABLENDENABLE,FALSE); // No need to perform Alpha Blending.

pd3dDevice->SetRenderState( D3DRS_STENCILENABLE, FALSE); // No need to perform Stencil Test.
pd3dDevice->SetRenderState( D3DRS_ZENABLE, D3DZB_FALSE);
// No Need for Depth Test
pd3dDevice->SetRenderState( D3DRS_ZWRITEENABLE, FALSE); // No Need to Save Z value in Depth buffer // Setup Direct3D Texture Blending states.
// Direct3D allows up to 8 stages, but we need only 1.

// Look up RGB value for each Vertex from (tu1, tv1) of pTextureIn.
pd3dDevice->SetTextureStageState( 0, D3DTSS_TEXCOORDINDEX , 0 );
// Use t0 texture coordinate for stage 0.
pd3dDevice->SetTextureStageState( 0, D3DTSS_COLOROP, D3DTOP_SELECTARG1); // Out put RGB value pd3dDevice->SetTextureStageState( 0, D3DTSS_COLORARG1, D3DTA_TEXTURE );// Output RGB value from texture.

```cpp
pd3dDevice->SetTextureStageState( 0, D3DTSS_ALPHAOP,
D3DTOP_DISABLE );
// No Alpha output from stage 0 and above
pd3dDevice->SetTextureStageState( 1, D3DTSS_COLOROP,
D3DTOP_DISABLE );

// No RGB output from stage 1 and above.
// Draw In-Coming source
// Use texture 2 and First mesh pd3dDevice->SetTexture(0, pTextureIn);
// pTextureIn is a Texture object stores in-coming video frame.
// Set this texture to texture blending stage 0.

LPD3DXMESH pPlaneMesh = m_pPlaneMesh->GetLocalMesh(); // Get
D3DXMesh object stored in device/GPU memory from CDXUTMesh.

pPlaneMesh->DrawSubset( 0 ); // Have D3D/GPU execute a draw use
this PlaneMesh, TextureIn and current settings.

// Draw Out-going source

// Set tv2 of each vertex of Transition pattern mesh to Progress
VERTEX_XYZ_TEX2* pVertices = NULL;
pSysMemMesh->LockVertexBuffer( D3DLOCK_NOSYSLOCK,
(void**)&pVertices );

DWORD dwNumPatternVertices = pSysMemMesh->GetNumVertices();
for(DWORD i = 0; i < dwNumPatternVertices; i++)
    pVertices[i].t2.y = fltProgress; // Progress
```

```
// fltProgress is calculated base on transition duration, frame
rate, and current frame.

pSysMemMesh->UnlockVertexBuffer();
m_pMesh->InvalidateDeviceObjects();
m_pMesh->RestoreDeviceObjects(pd3dDevice);

// RestoreDeviceObjects() will create Local Mesh

// Dissolve effect technique requires render PatternMesh twice.
// The first pass, it add Alpha values from dissolve map and alpha
// map.  This value is compared against a pre-defined thresh hold in
// AlphaTest operation. Stencil value increased for Pixels pass the
// test. A RGB value is not written into render target.

//Use alpha blending with src=zero and dest=one to prevent writes
to color buffer pd3dDevice->SetRenderState( D3DRS_ALPHABLENDENABLE, TRUE);
pd3dDevice->SetRenderState( D3DRS_SRCBLEND,
D3DBLEND_ZERO);
pd3dDevice->SetRenderState( D3DRS_DESTBLEND,
D3DBLEND_ONE);

// disable depth buffering
pd3dDevice->SetRenderState( D3DRS_ZENABLE,       D3DZB_FALSE);
pd3dDevice->SetRenderState( D3DRS_ZWRITEENABLE,  FALSE);

// set up stencil function to increment stencil of pixels that
pass alpha testing
pd3dDevice->SetRenderState( D3DRS_STENCILPASS,
D3DSTENCILOP_INCR);
```

```cpp
pd3dDevice->SetRenderState( D3DRS_STENCILENABLE, TRUE);
pd3dDevice->SetRenderState( D3DRS_STENCILFUNC,  D3DCMP_ALWAYS);

// set up alpha testing
pd3dDevice->SetRenderState( D3DRS_ALPHATESTENABLE,TRUE);
pd3dDevice->SetRenderState( D3DRS_ALPHAFUNC,D3DCMP_GREATER);
pd3dDevice->SetRenderState( D3DRS_ALPHAREF, 0x40);

// Texture Blending
// Stage 0 :
// ColorOp : Current
// AlphaOp : Select Texture
RTN_HR_IF_FAILED(pd3dDevice->SetTexture(0, m_pAlphaMapTexture));
pd3dDevice->SetTextureStageState( 0, D3DTSS_TEXCOORDINDEX , 1 );
pd3dDevice->SetTextureStageState( 0, D3DTSS_COLOROP,
D3DTOP_SELECTARG1);
pd3dDevice->SetTextureStageState( 0, D3DTSS_COLORARG1,
D3DTA_CURRENT );
pd3dDevice->SetTextureStageState( 0, D3DTSS_ALPHAOP,
D3DTOP_SELECTARG1
);
pd3dDevice->SetTextureStageState( 0, D3DTSS_ALPHAARG1,
D3DTA_TEXTURE );

// Stage 1 :
// ColorOp : Current
// AlphaOp : Add - Signed
RTN_HR_IF_FAILED(pd3dDevice->SetTexture(1,
m_pDissolveMapTexture));
pd3dDevice->SetTextureStageState( 1, D3DTSS_TEXCOORDINDEX , 0 );
pd3dDevice->SetTextureStageState( 1, D3DTSS_COLOROP,
D3DTOP_SELECTARG1);
```

```
pd3dDevice->SetTextureStageState( 1, D3DTSS_COLORARG1,
D3DTA_CURRENT );
// Add Alpha value from two alpha textures.
pd3dDevice->SetTextureStageState( 1, D3DTSS_ALPHAOP,
D3DTOP_ADDSIGNED);
pd3dDevice->SetTextureStageState( 1, D3DTSS_ALPHAARG1,
D3DTA_TEXTURE );

// Stage 2 : Disable
pd3dDevice->SetTextureStageState( 2, D3DTSS_ALPHAOP,
D3DTOP_DISABLE );
pd3dDevice->SetTextureStageState( 2, D3DTSS_COLOROP,
D3DTOP_DISABLE );

pd3dDevice->SetSamplerState( 0, D3DSAMP_MINFILTER, D3DTEXF_LINEAR
);
pd3dDevice->SetSamplerState( 0, D3DSAMP_MAGFILTER, D3DTEXF_LINEAR
);

pd3dDevice->SetSamplerState( 1, D3DSAMP_MINFILTER, D3DTEXF_POINT
);
pd3dDevice->SetSamplerState( 1, D3DSAMP_MAGFILTER, D3DTEXF_POINT
);

pd3dDevice->SetSamplerState(0, D3DSAMP_ADDRESSU,
D3DTADDRESS_CLAMP );
pd3dDevice->SetSamplerState(0, D3DSAMP_ADDRESSV,
D3DTADDRESS_CLAMP );

pd3dDevice->SetSamplerState(1, D3DSAMP_ADDRESSU,
D3DTADDRESS_CLAMP );
```

```
pd3dDevice->SetSamplerState(1, D3DSAMP_ADDRESSV,
D3DTADDRESS_CLAMP );

LPD3DXMESH pPatternMesh = m_pPatternMesh->GetLocalMesh();
pPatternMesh->DrawSubset( 0 ); // Have D3D/GPU execute a draw use
this PatternMesh with current settings.

// The second pass, it will perform depth test and stencil test.
// Only pixels passes both tests get drawn into render target.
// Stencil test form the random pattern along wipe edge.
// Depth test is to ensure no pixels pop up in the wrong side of
edge.

// Setup Render State for Render Video 1
// disable alpha blending and testing
pd3dDevice->SetRenderState( D3DRS_ALPHATESTENABLE,   FALSE);
pd3dDevice->SetRenderState( D3DRS_ALPHABLENDENABLE,  FALSE);

// set up stencil states for rendering of first scene
pd3dDevice->SetRenderState( D3DRS_STENCILENABLE,    TRUE);
pd3dDevice->SetRenderState( D3DRS_STENCILPASS,
D3DSTENCILOP_KEEP);
pd3dDevice->SetRenderState( D3DRS_STENCILREF,       1);
pd3dDevice->SetRenderState( D3DRS_STENCILFUNC,      D3DCMP_EQUAL);

pd3dDevice->SetRenderState( D3DRS_ZENABLE,          D3DZB_TRUE);
pd3dDevice->SetRenderState( D3DRS_ZWRITEENABLE, TRUEE);

pd3dDevice->SetTextureStageState( 0, D3DTSS_TEXCOORDINDEX , 0 );
pd3dDevice->SetTextureStageState( 0, D3DTSS_COLOROP,
D3DTOP_SELECTARG1);
```

```
pd3dDevice->SetTextureStageState( 0, D3DTSS_COLORARG1,
D3DTA_TEXTURE );
pd3dDevice->SetTextureStageState( 1, D3DTSS_ALPHAOP,
D3DTOP_DISABLE );
pd3dDevice->SetTextureStageState( 1, D3DTSS_COLOROP,
D3DTOP_DISABLE );

pd3dDevice->SetSamplerState( 0, D3DSAMP_MINFILTER, D3DTEXF_LINEAR
);
pd3dDevice->SetSamplerState( 0, D3DSAMP_MAGFILTER, D3DTEXF_LINEAR
);

// Use texture 1 and Transition pattern mesh
pd3dDevice->SetTexture(0, pTextureOut);
// pTextureOut is a Texture object stores Out-Going video frame.
// Set this texture to texture blending stage 0.

// Apply translate transform matrix to move transition pattern
mesh lower in z direction.

D3DXMATRIX matTranslation;
D3DXMatrixTranslation( &matTranslation, 0, 0, -fltProgress +
m_fltGradientWidth);

// Create a translate transform matrix to move PatternMesh lower
in z direction.
pd3dDevice->SetTransform( D3DTS_WORLD, &matTranslation );

// Set D3D world transform matrix.
// D3D World transform convert model space coordinates to world
space.
```

```
// (0, 0, 0) in Transition pattern mesh becomes (0, 0, -fltProgress + m_fltGradientWidth)
pPatternMesh->DrawSubset( 0 ); // Have D3D/GPU execute a draw use this PatternMesh, TextureOut with current settings.
```

What is claimed is:

1. A method for generating a two dimensional transition between a first media object and a second media object using a graphics processing unit (GPU), said method comprising:

defining, by the GPU only, a three dimensional model corresponding to a desired two dimensional transition pattern defining a pattern for implementing the two dimensional transition, said transition pattern defining shapes to be displayed as the second media object progressively replaces to the first media object, said transition pattern including at least one of the following: a swipe, diagonal down, star, wheel, bow tie, circle, rectangle, split, reveal and inset, iris, filled V, zigzag, checkerboard, diagonal box, diagonal cross, diamond, radar, stars, circles, keyhole, heart, sweep (-in, -up, -out, -down), fan (-up, -out, -down, -in), eye;

mapping, by the GPU only, a plurality of vertices of the first media object in a two dimensional coordinate system to a first mesh to create a first mapped media object corresponding to the three dimensional model, wherein the first mesh relates to the three dimensional model;

mapping, by the GPU only, a plurality of vertices of the second media object in the two dimensional coordinate system to a transition pattern mesh to create a second mapped media object corresponding to the three dimensional model, wherein the transition pattern mesh relates to the three dimensional model and corresponds to the two dimensional transition pattern; and rendering between the first media object and the second media object the two dimensional transition from the first mapped media object corresponding to the three dimensional model to the second mapped media object corresponding to the three dimensional model using the graphics processing unit only such that the rendered two dimensional transition defines a transition based on the two dimensional transition pattern from the first media object to the second media object so that the second media object progressively replaces the first media object as the transition is displayed according to the defined transition pattern.

2. The method of claim 1 further comprising generating an alpha map including alpha values and wherein the rendering comprises rendering the transition from the first mapped media object and the second mapped media object and the alpha map as a function of run-time generation of the alpha map.

3. The method of claim 2 further comprising:

calculating alpha values corresponding to the pixels along an edge intersecting the first media object and the second media object as a function of the alpha map; and applying the calculated alpha values to the pixels in coordination with the rendering of the transition between the first media object and the second media object.

4. The method of claim 3 further comprising:

calculating dissolved alpha values corresponding to the pixels along an edge intersecting the first media object and the second media object as a function of a dissolve map; and applying the calculated dissolved alpha values to the pixels in coordination with the rendering between the transition of the first media object and the second media object.

5. The method of claim 1 wherein the transition pattern mesh represents a three dimensional volume cube, wherein the three dimensional volume cube includes x-,y-, and z-coordinate parameters.

6. The method of claim 1 further comprising:

mapping a plurality of vertices of a third media object to the received transition pattern mesh to create a third mapped media object; and rendering the transition from the first mapped media object, the second mapped media object and the third mapped media object.

7. The method of claim 1 wherein one or more computer-readable media have computer-executable instructions for performing the method recited in claim 1.

8. A system for generating a two dimensional transition between a first media object and a second media object, said system comprising:

an interface for receiving said first media object, said second media object, and a transition pattern mesh, wherein said transition pattern mesh being represented according to a three dimensional (3D) model;

a graphics processing unit (GPU) configured as the only processing unit to execute computer-executable instructions embodied in the following:

a transition generator for mapping a plurality of vertices of the received first media object to a first mesh to create a first mapped media object according to the 3D model, wherein said transition generator maps a plurality of vertices of the received second media object to the transition pattern mesh to create a second mapped media object according to the 3D model; and wherein the GPU renders the two dimensional transition between the first media object and the second media object from the first mapped media object and the second mapped media object such that the rendered two dimensional transition defines a transition based on a two dimensional transition pattern from the first media object to the second media object so that the second media object progressively replaces the first media object as the transition is displayed according to the transition pattern, said two dimensional transition pattern defining a pattern for implementing the two dimensional transition, said two dimensional transition pattern defining shapes to be displayed and including at least one of the following: a swipe, diagonal down, star, wheel, bow tie, circle, rectangle, split, reveal and inset, iris, filled V, zigzag, checkerboard, diagonal box, diagonal cross, diamond, radar, stars, circles, keyhole, heart, sweep (-in, -up, -out, -down), fan (-up, -out, -down, -in), eye.

9. The system of claim 8 wherein the graphics processor renders the transition between the first media object and the second media object from the first mapped media object, the second mapped media object, and an alpha map, said alpha map includes alpha values corresponding to a plurality of pixels locating along an edge where the first mapped media object and the second mapped media object intersect.

10. The system of claim 8 wherein the transition pattern mesh represents a three dimensional volume cube, wherein the three dimensional volume cube includes x-,y-, and z-coordinate parameters.

11. The system of claim 8 wherein z-coordinate parameter of the transition pattern mesh represents a function of the progress of rendering.

12. The system of claim 8 wherein the interface further receiving a third media object and wherein the graphics processor further rendering the transition between the first media object and the second media object from the first mapped media object, the second mapped media object and the third media object.

13. A system for generating a transition between a first media object and a second media object, said system comprising:
- a first processor for rendering the first media object and the second media object, said first processor being a central processing unit (CPU);
- an interface for receiving said first media object, said second media object, and a transition pattern mesh, wherein said transition pattern mesh being represented according to a three dimensional (3D) model, said 3D model being defined by a second processor only, said second processor being a graphics processing unit (GPU) only;
- a transition generator, executed by the second processor only, for mapping a plurality of vertices of the received first media object to a first mesh to create a first mapped media object according to the 3D model, wherein said transition generator maps a plurality of vertices of the received second media object to the received transition pattern mesh to create a second mapped media object according to the 3D model; and
- wherein the second processor, independent of said first processor, renders the transition in two dimensions between the first media object and the second media object from the first mapped media object and the second mapped media object in three dimensions such that the rendered transition in two dimension defines a transition based on a two dimensional transition pattern from the first media object to the second media object so that the second media object progressively replaces the first media object as the transition is displayed according to the transition pattern, wherein said two dimensional transition pattern defines a pattern for implementing the two dimensional transition, said two dimensional transition pattern defining shapes to be displayed and including at least one of the following: a swipe, diagonal down, star, wheel, bow tie, circle, rectangle, split, reveal and inset, iris, filled V, zigzag, checkerboard, diagonal box, diagonal cross, diamond, radar, stars, circles, keyhole, heart, sweep (-in, -up, -out, -down), fan (-up, -out, -down, -in), eye.

14. The system of claim 13 wherein the second processor or the second set of instructions renders the transition between the first media object and the second media object from the first mapped media object, the second mapped media object, and an alpha map, said alpha map includes alpha values corresponding to a plurality of pixels locating along an edge where the first mapped media object and the second mapped media object intersect.

15. The system of claim 13 further comprising a frame buffer for storing at least one of the following for the second processor: vertex data, texture data, or stencil data.

16. The system of claim 13 wherein the transition pattern mesh represents a three dimensional volume cube, wherein the three dimensional volume cube includes x-,y-, and z-coordinate parameters.

17. The system of claim 13 wherein the interface further receiving a dissolve map and wherein the second processor or the second set of instructions further rendering the transition between the first media object and the second media object from the first mapped media object, the second mapped media object and dissolved alpha values in the dissolved map.

* * * * *